(12) United States Patent
Kato

(10) Patent No.: US 10,504,477 B2
(45) Date of Patent: Dec. 10, 2019

(54) DISPLAY DEVICE

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/872,388

(22) Filed: Jan. 16, 2018

(65) Prior Publication Data

US 2018/0211630 A1    Jul. 26, 2018

(30) Foreign Application Priority Data

Jan. 23, 2017   (JP) .................................. 2017-009541

(51) Int. Cl.
| | | |
|---|---|---|
| *G02F 1/1343* | (2006.01) | |
| *G02F 1/1345* | (2006.01) | |
| *G02F 1/137* | (2006.01) | |
| *G02F 1/1335* | (2006.01) | |
| *G02F 1/1334* | (2006.01) | |

(Continued)

(52) U.S. Cl.
CPC ........... *G09G 3/3696* (2013.01); *G02F 1/137* (2013.01); *G02F 1/1334* (2013.01); *G02F 1/1345* (2013.01); *G02F 1/133621* (2013.01); *G02F 1/134309* (2013.01); *G09G 3/2092* (2013.01); *G09G 3/3413* (2013.01); *G09G 3/3607* (2013.01); *G09G 3/3611* (2013.01); *G09G 3/3614* (2013.01); *G09G 3/3648* (2013.01); *G09G 3/3655* (2013.01); *G09G 3/3674* (2013.01); *G02F 2001/13347* (2013.01); *G02F 2001/133342* (2013.01); *G02F 2001/133616* (2013.01); *G02F 2001/133622* (2013.01); *G02F 2201/121* (2013.01); *G02F 2201/123* (2013.01); *G09G 2300/0456* (2013.01); *G09G 2300/0478* (2013.01); *G09G 2300/0495* (2013.01); *G09G 2310/0237* (2013.01); *G09G 2310/08* (2013.01);

(Continued)

(58) Field of Classification Search
CPC .. G09G 3/3696; G09G 3/2092; G09G 3/3413; G09G 3/3607; G09G 3/3611; G09G 3/3614; G09G 3/3648; G09G 3/3655; G09G 3/3674; G02F 1/1334; G02F 1/133621; G02F 1/134309; G02F 1/1345; G02F 1/137
USPC ........................................................ 345/212
See application file for complete search history.

(56) References Cited

U.S. PATENT DOCUMENTS

| | | | | |
|---|---|---|---|---|
| 6,414,669 B1 * | 7/2002 | Masazumi | ........... | G09G 3/3629 345/100 |
| 2012/0262430 A1 * | 10/2012 | Ho | ...................... | G02F 1/13624 345/204 |

(Continued)

FOREIGN PATENT DOCUMENTS

| | | |
|---|---|---|
| JP | 5932135 B2 | 6/2016 |
| WO | 2014/017344 A1 | 1/2014 |

*Primary Examiner* — Jennifer Mehmood
*Assistant Examiner* — Ngan T Pham Lu
(74) *Attorney, Agent, or Firm* — K&L Gates LLP

(57) ABSTRACT

According to one embodiment, a display device includes a display panel including a plurality of pixel electrodes, a common electrode and a display function layer, a light source unit, and a controller. When a character is displayed in a first area of a display area, the controller applies a color other than the achromatic color to the first area, and makes a second area and a non-object area transparent. Transparency of the non-object area is higher than transparency of the second area.

19 Claims, 26 Drawing Sheets

(51) Int. Cl.
   *G09G 3/34*         (2006.01)
   *G09G 3/36*         (2006.01)
   *G09G 3/20*         (2006.01)
   *G02F 1/1333*         (2006.01)

(52) U.S. Cl.
   CPC . *G09G 2320/062* (2013.01); *G09G 2320/064* (2013.01); *G09G 2320/0666* (2013.01)

(56) References Cited

U.S. PATENT DOCUMENTS

| | | | |
|---|---|---|---|
| 2015/0286097 A1* | 10/2015 | Lee | G02F 1/133617 349/61 |
| 2015/0325163 A1* | 11/2015 | Kobayashi | G02F 1/13476 345/690 |
| 2016/0178979 A1* | 6/2016 | Kita | G02F 1/134309 349/33 |
| 2016/0306511 A1* | 10/2016 | Park | G06F 3/0482 |
| 2016/0343285 A1* | 11/2016 | Yamaguchi | G02F 1/133536 |

* cited by examiner

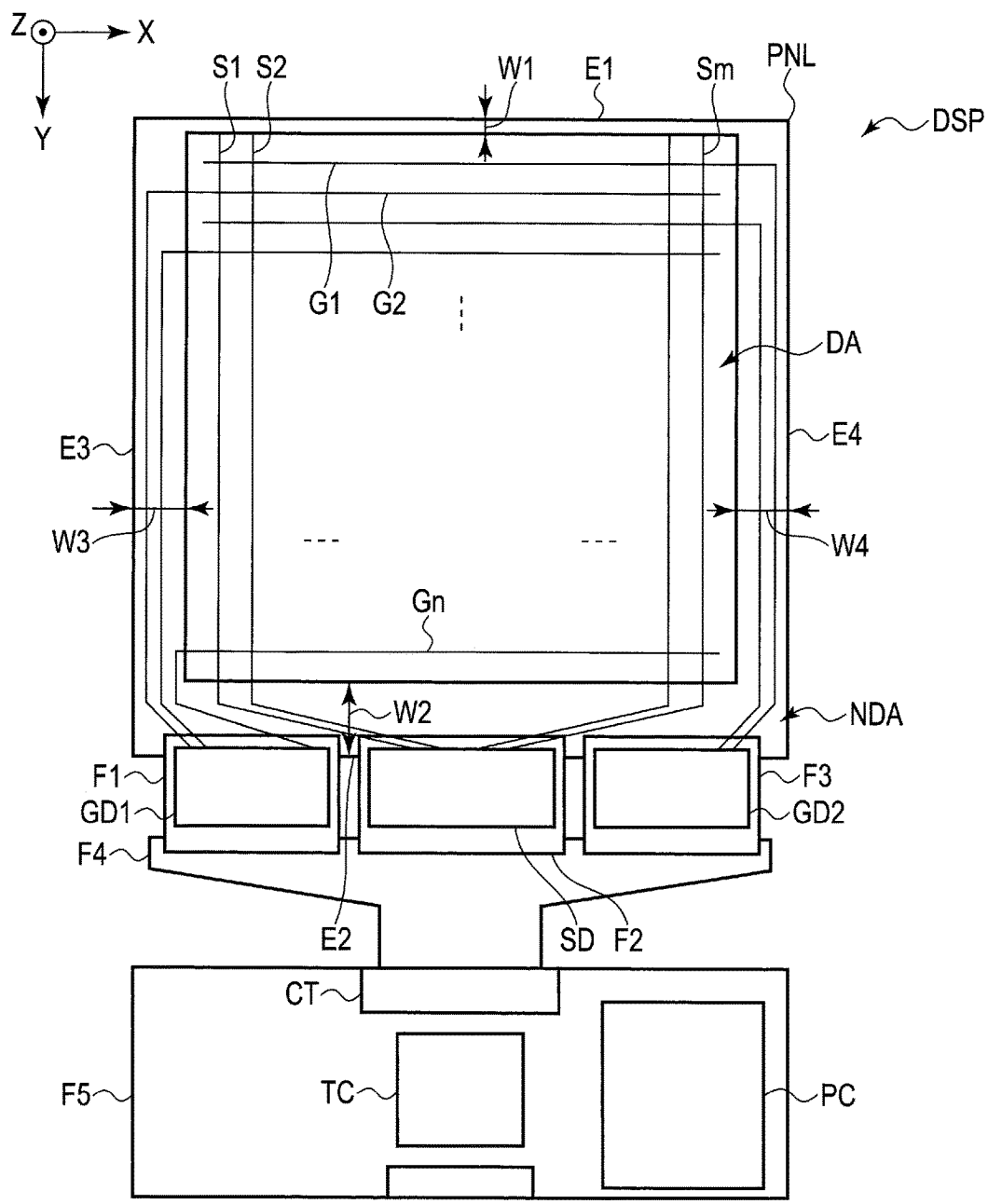
F I G. 1

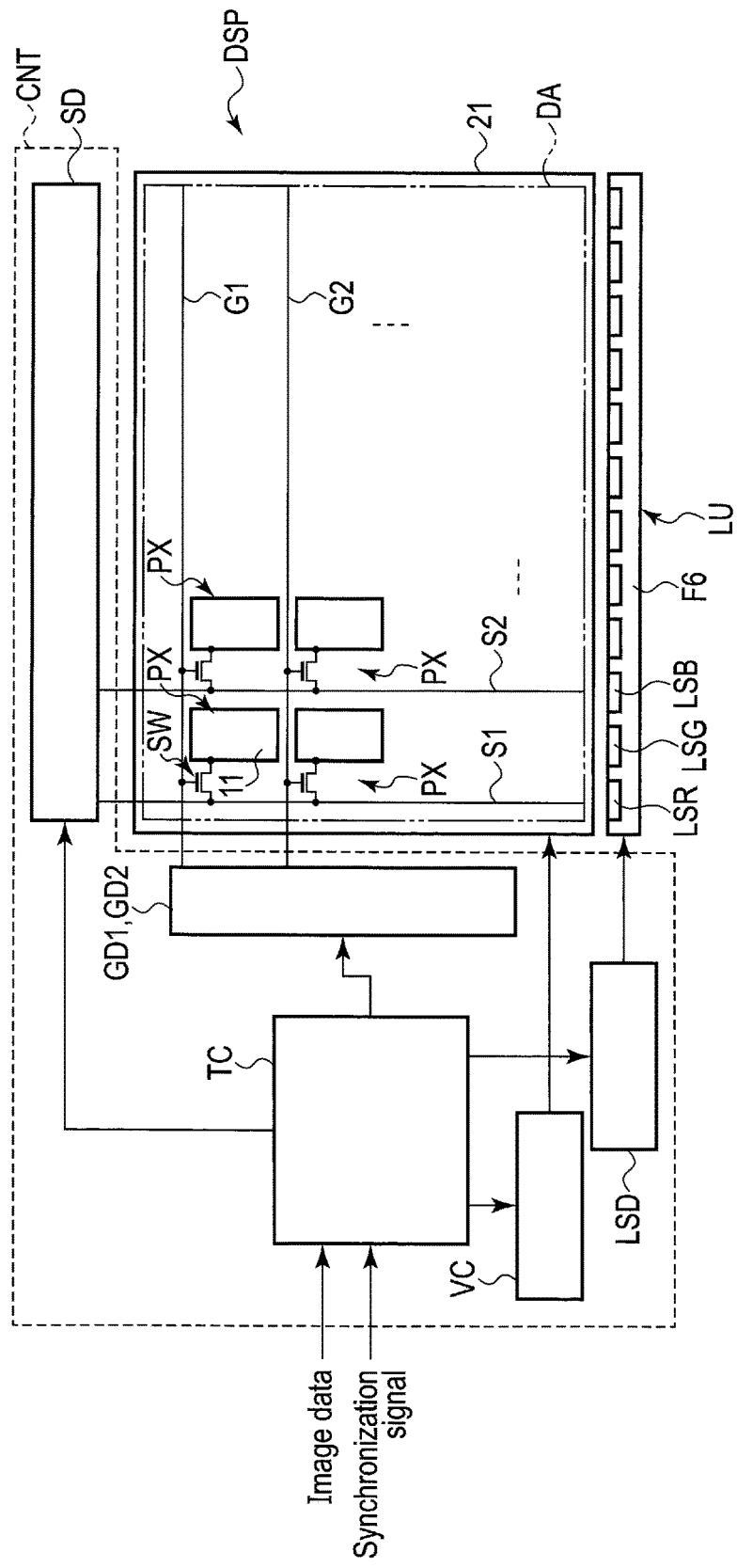
F I G. 3

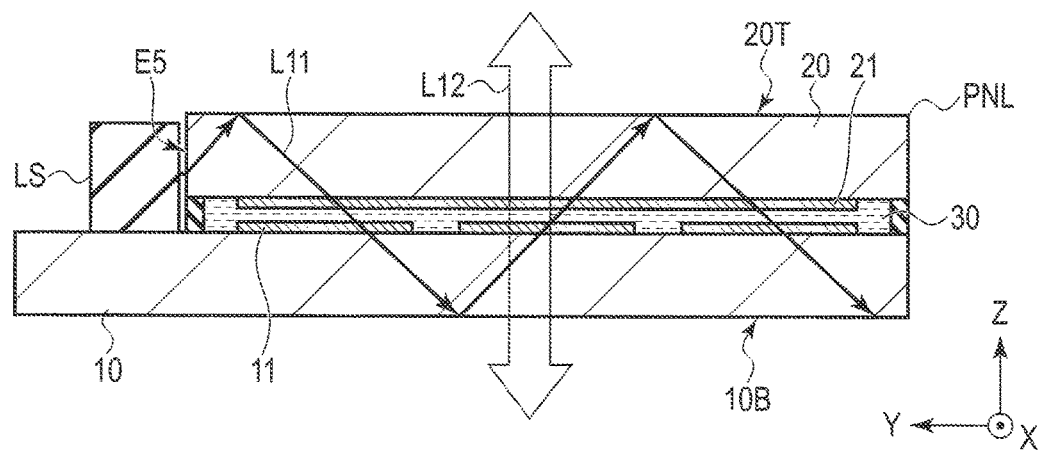
F I G. 5A
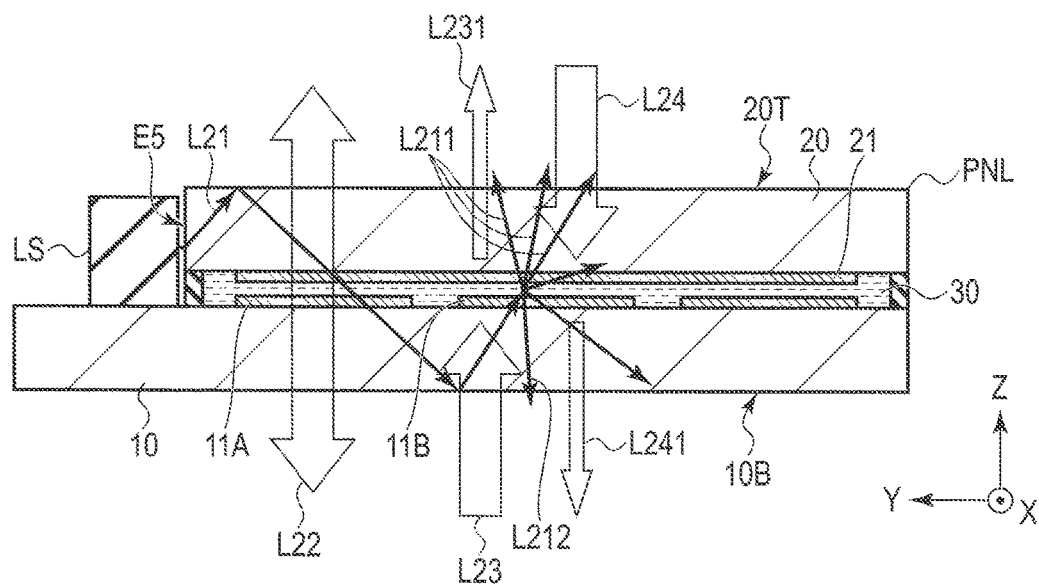
F I G. 5B

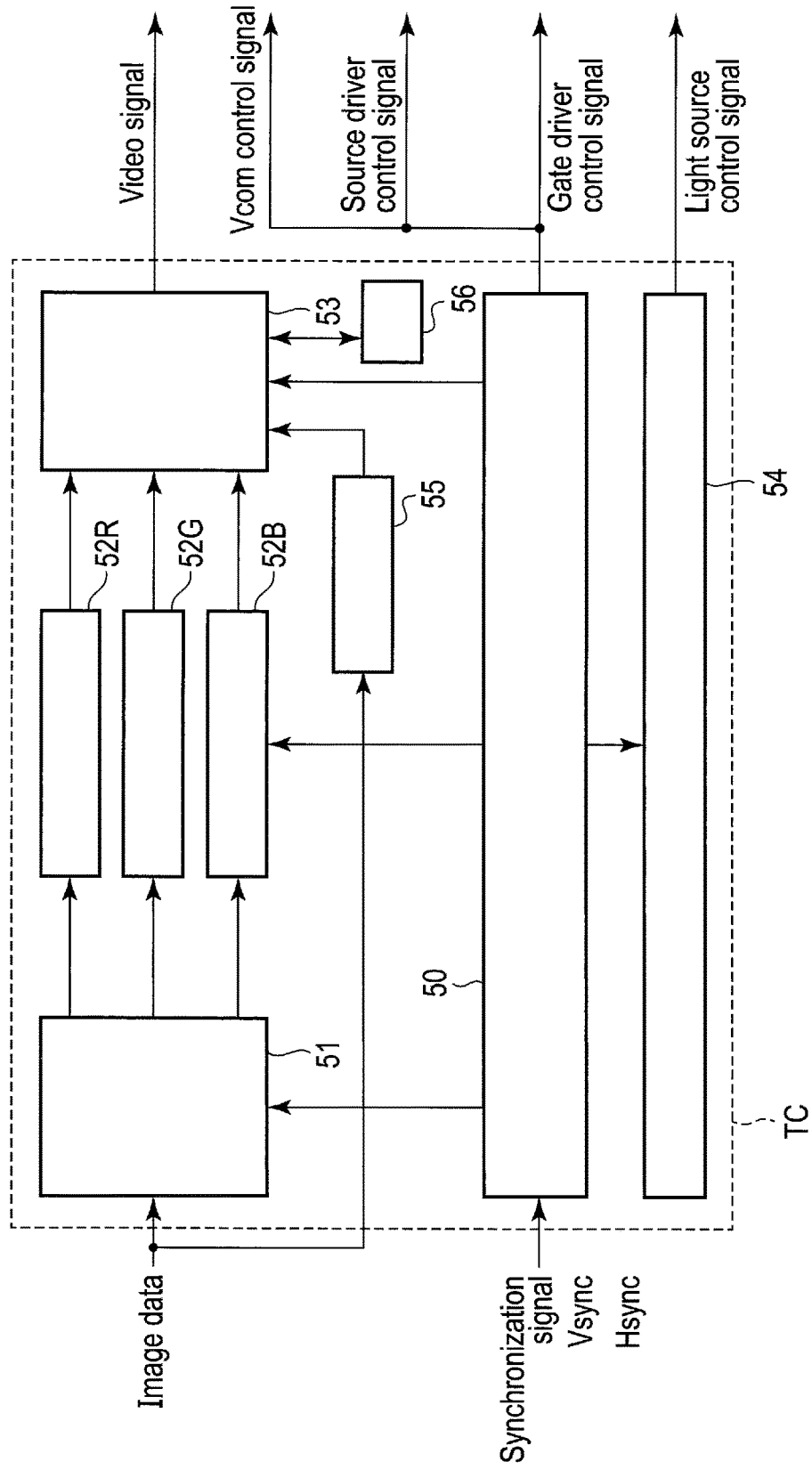
F I G. 11

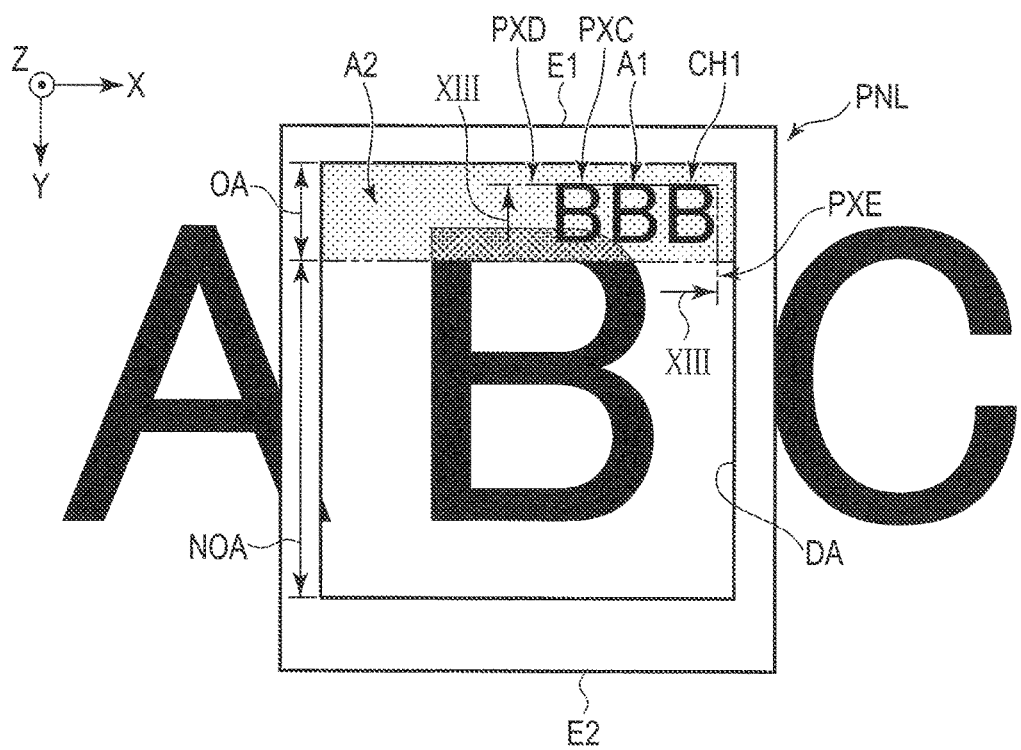
F I G. 12
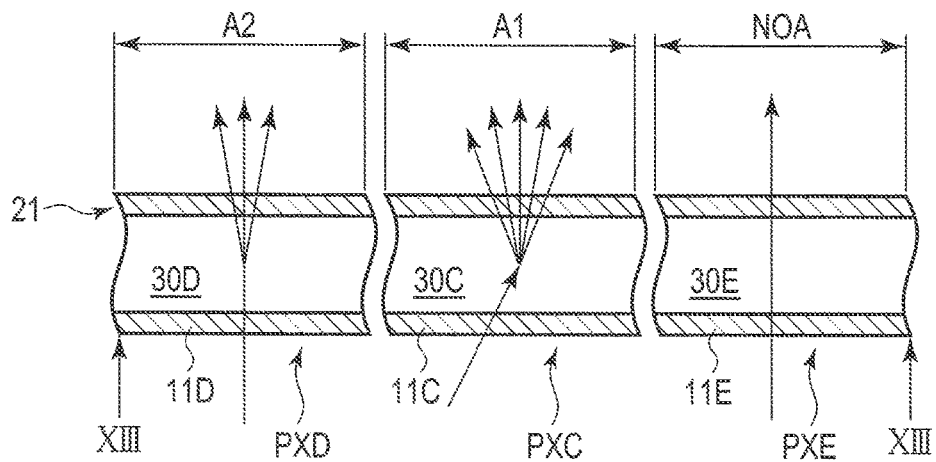
F I G. 13A

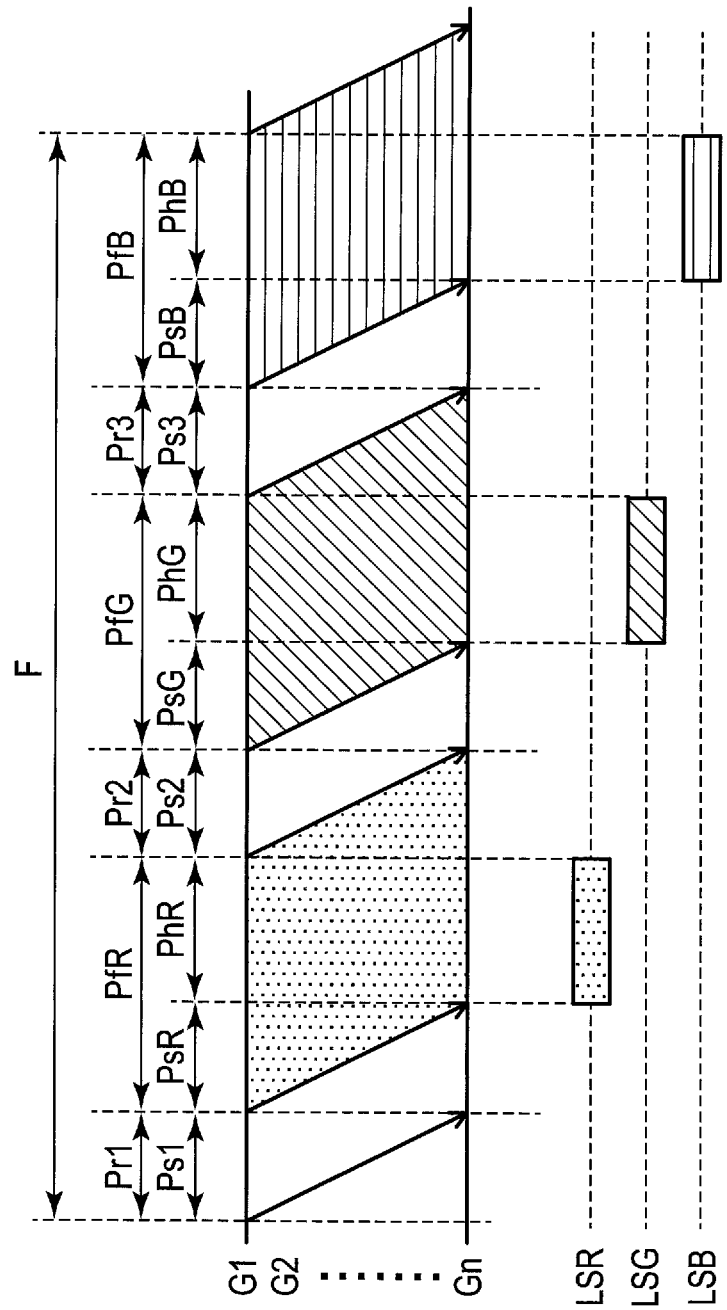
F I G. 16

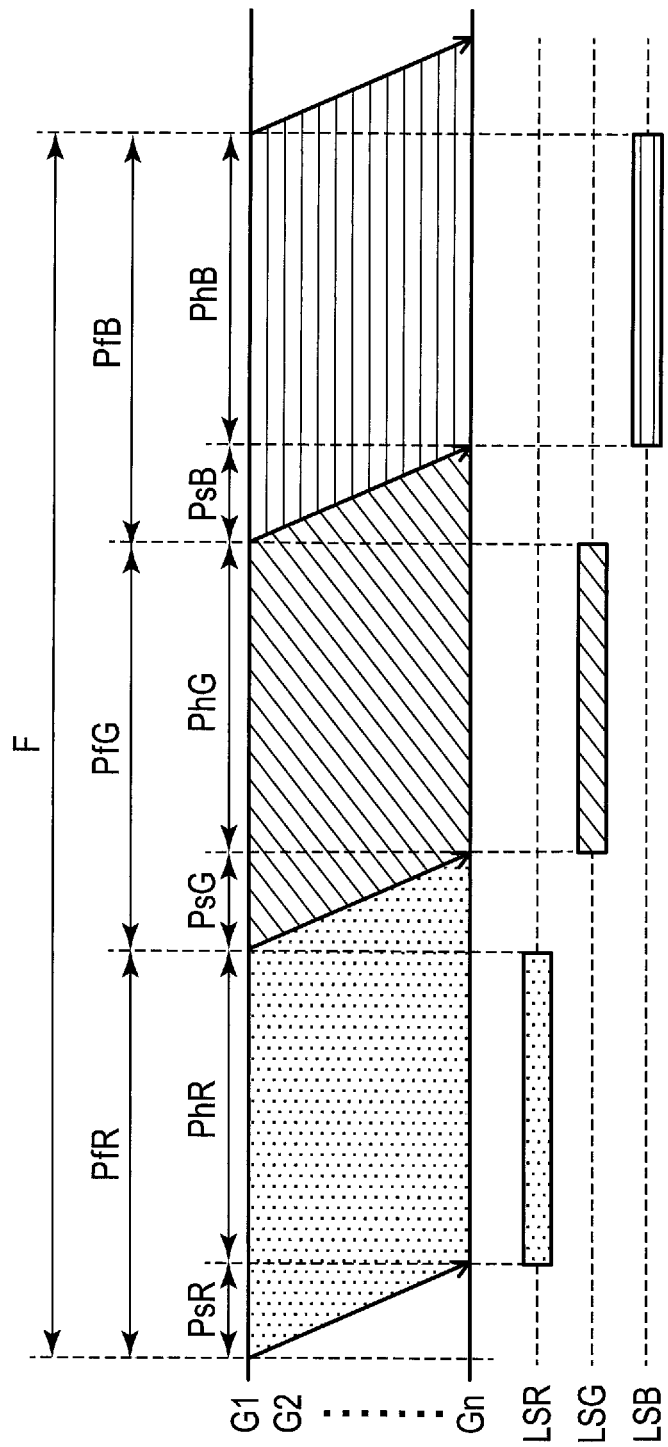
F I G. 18

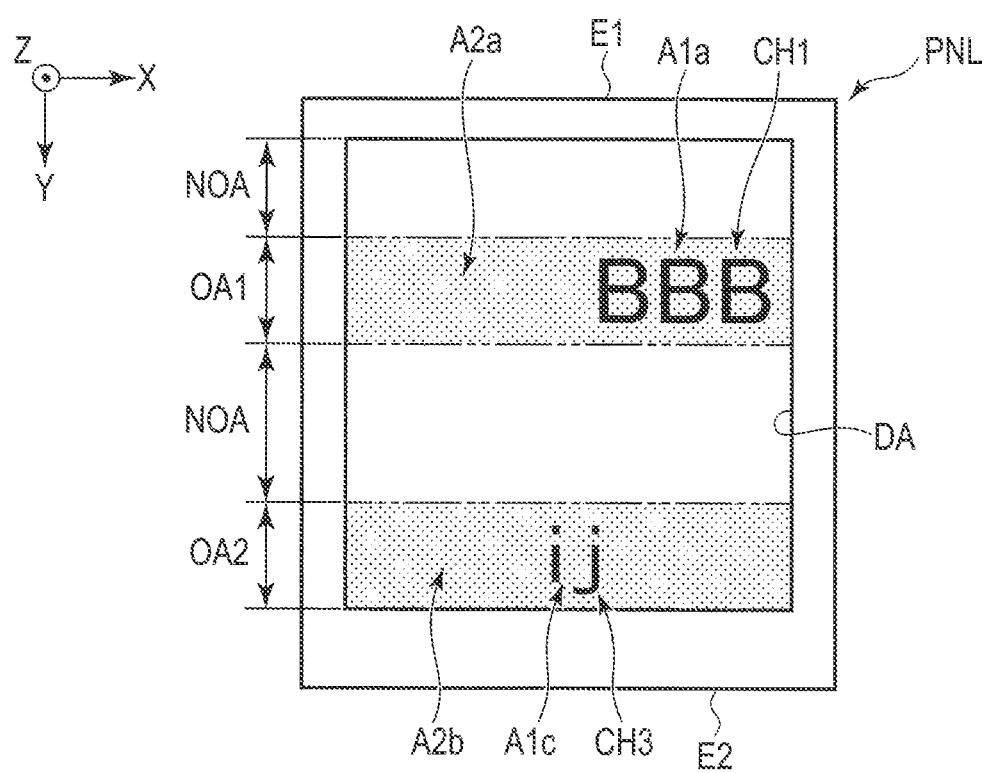
F I G. 25

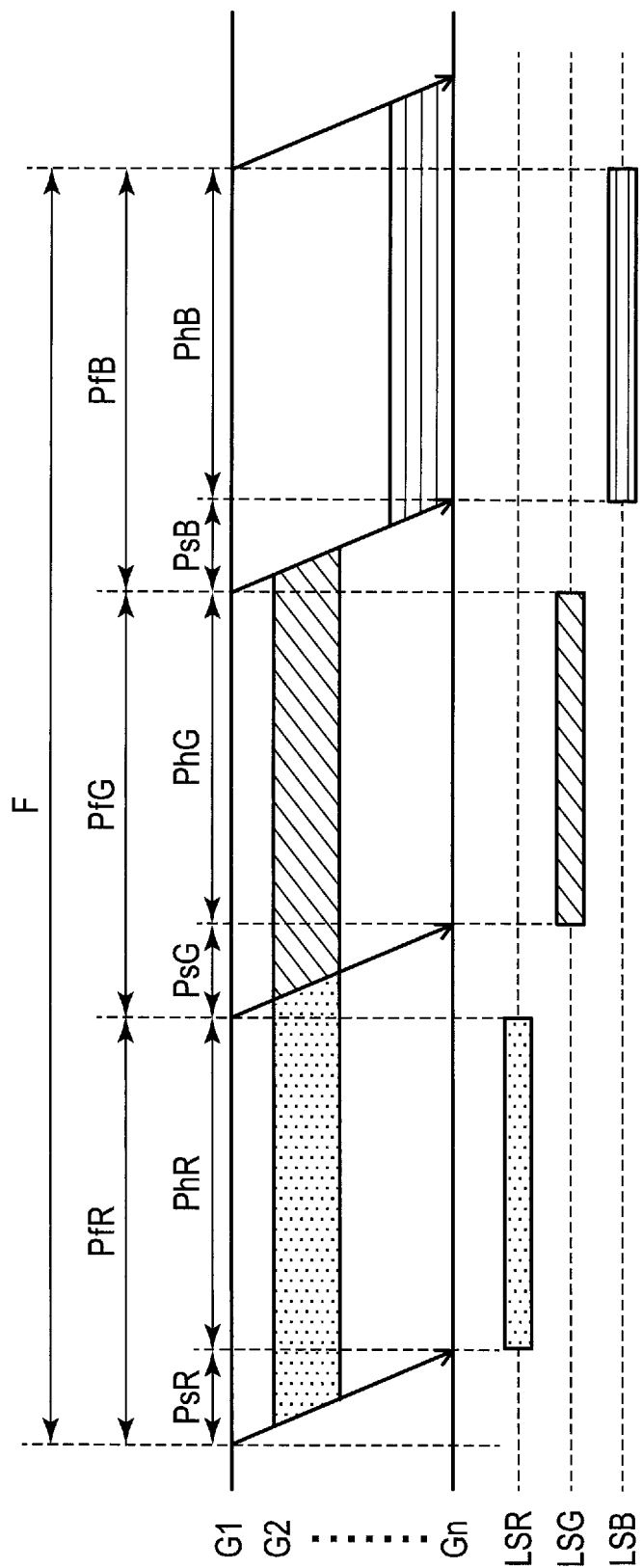
F I G. 26

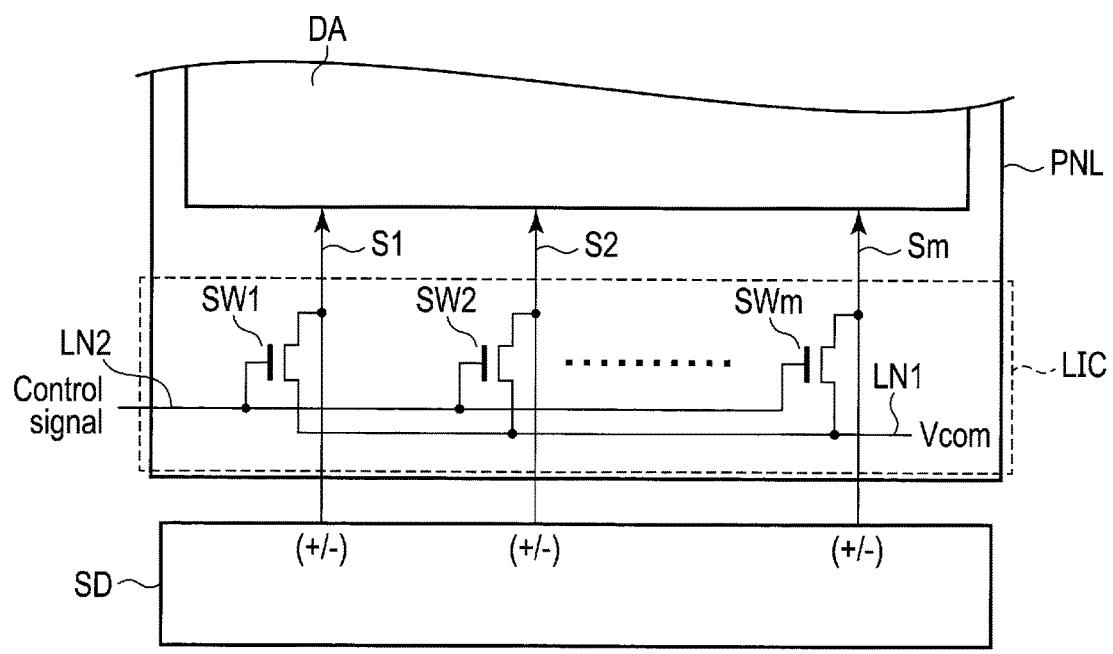
F I G. 28

DISPLAY DEVICE

CROSS-REFERENCE TO RELATED APPLICATIONS

This application is based upon and claims the benefit of priority from Japanese Patent Application No. 2017-009541, filed Jan. 23, 2017, the entire contents of which are incorporated herein by reference.

FIELD

Embodiments described herein relate generally to a display device.

BACKGROUND

In recent years, the following display device has been suggested. The display device includes a polymer dispersed liquid crystal (PDLC) panel capable of switching the state between a diffusing state for diffusing incident light and a transmitting state for transmitting incident light. The display device is capable of displaying an image. The user can view the background through the display device. In the display device, each frame period comprises a plurality of sub-frame periods. The display device realizes multicolor display by displaying an image while the display color is switched for each sub-frame period.

SUMMARY

The present application generally relates to a display device.

According to one embodiment, a display device includes a display panel including a plurality of pixel electrodes, a common electrode and a display function layer, a light source unit, and a controller. When a character is displayed in a first area of a display area, the controller applies a color other than the achromatic color to the first area, and makes a second area and a non-object area transparent. Transparency of the non-object area is higher than transparency of the second area.

BRIEF DESCRIPTION OF THE DRAWINGS

FIG. 1 is a plan view showing a structural example of a display device according to a first embodiment.

FIG. 3 shows the main structural components of the display device shown in FIG. 1.

FIG. 5A is a cross-sectional view showing a display panel when the liquid crystal layer is in a transparent state.

FIG. 5B is a cross-sectional view showing the display panel when the liquid crystal layer is in a scattering state.

FIG. 11 shows a configuration example of the timing controller shown in FIG. 3.

FIG. 12 shows a usage example of the display device, and is a plan view of the display panel showing a state in which characters are displayed in a single object area.

FIG. 13A is a cross-sectional view of the display panel along line XIII-XIII of FIG. 12.

FIG. 16 is a timing chart showing another example of display operation.

FIG. 18 is a timing chart showing another example of display operation.

FIG. 25 shows a usage example of the display device of modification example 4 of the first embodiment, and is a plan view of the display panel showing a state in which characters are displayed in two object areas.

FIG. 26 is a timing chart showing an example of the display operation of the display device of modification example 4.

FIG. 28 shows a structural example of the Vcom lead-in circuit shown in FIG. 27.

DETAILED DESCRIPTION

Figure 2:
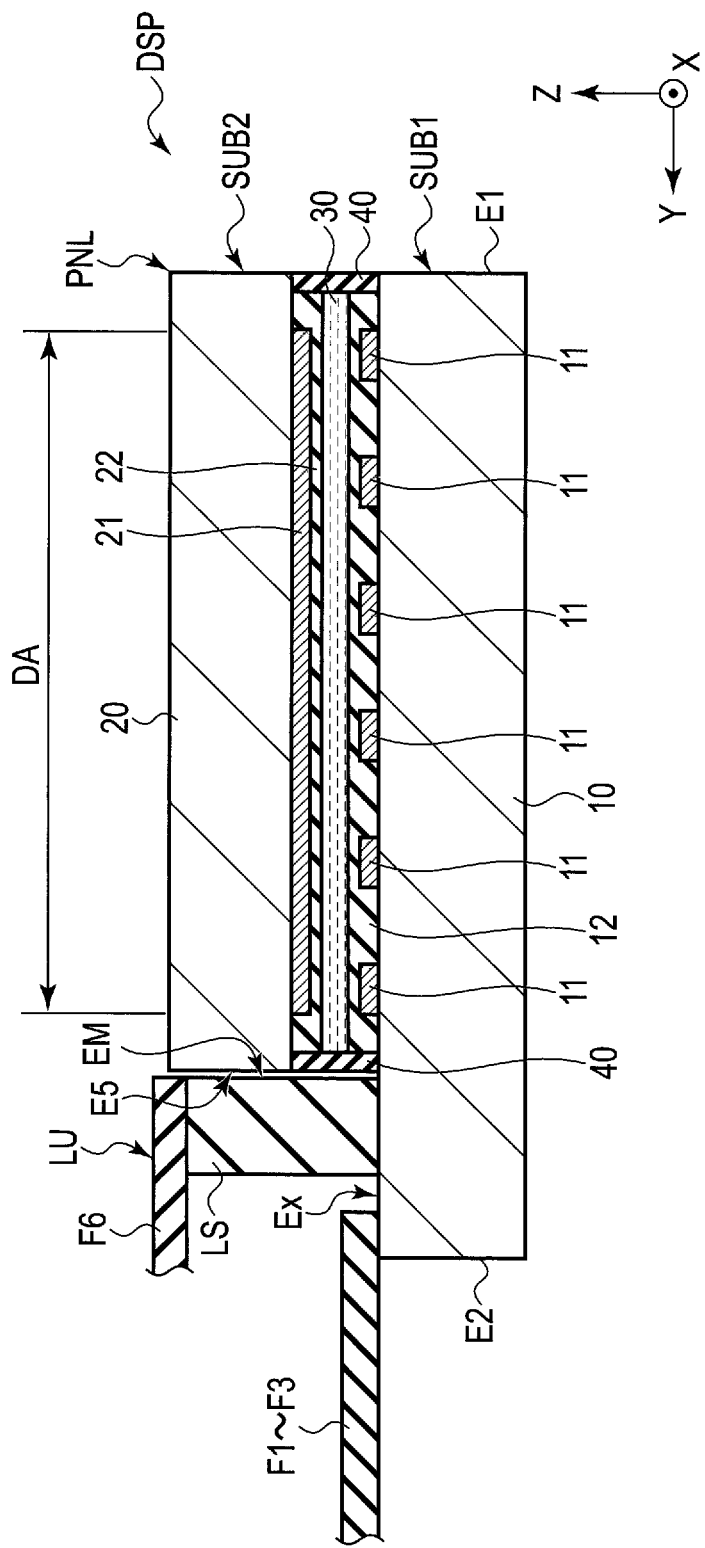
FIG. 2 is a cross-sectional view of the display device shown in FIG. 1.

In general, according to one embodiment, there is provided a display device comprising: a display panel comprising: a plurality of pixel electrodes located in a display area, and provided in a plurality of rows; a common electrode located in the display area; and a display function layer located in the display area; a light source unit located a non-display area outside the display area, and emitting light in a color other than an achromatic color to the display function layer; and a controller which controls a driving of the pixel electrodes, the common electrode and the light source unit, wherein when a character is displayed in a first area of the display area, the controller applies a color other than the achromatic color to the first area, and makes a second area and a non-object area transparent, the second area is an area other than the first area in an object area at least including an entire area of a row in which the first area is located, the non-object area is an area other than the object area in the display area, and transparency of the non-object area is higher than transparency of the second area.

According to another embodiment, there is provided a display device comprising: a display panel comprising: a display area including a first area and a second area, the second area being an area other than the first area in an object area at least including an entire area of a row in which the first area is located; a plurality of pixel electrodes including a first pixel electrode located in the first area and a second pixel electrode located in the second area, located in the display area, and provided in a plurality of rows; a common electrode located in the display area; a liquid crystal layer including a first liquid crystal layer to which voltage applied between the first pixel electrode and the common electrode is applied and a second liquid crystal layer to which voltage applied between the second pixel electrode and the common electrode is applied, located in the display area, and using a reverse mode polymer dispersed liquid crystal; a light source unit located a non-display area outside an area facing the display area of the display panel, and emitting light to the liquid crystal layer; and a controller which controls a driving an operation of the pixel electrodes, the common electrode and the light source unit, wherein when a character is displayed in the first area of the display area, the controller applies scattering voltage to the first liquid crystal layer and scatters light entering the first liquid crystal layer, and applies first transparent voltage to the second liquid crystal layer, maintains parallelism of light entering the second liquid crystal layer, and makes the second area transparent, and when a highest degree of scattering of light entering the liquid crystal layer when the scattering voltage is applied to the liquid crystal layer is 100%, the first transparent voltage is voltage in which the degree of scattering is less than or equal to 50%.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same structural elements as those described in connection with preceding drawings are denoted by like reference numbers, detailed description thereof being omitted unless necessary.

In each embodiment, as an example of a display device, a display device to which a polymer dispersed liquid crystal is applied is explained. The display device of each embodiment may be applied to various devices such as a smartphone, a tablet and a mobile phone.

First Embodiment

FIG. 1 is a plan view showing a structural example of a display device DSP according to the present embodiment.

As shown in FIG. 1, a first direction X intersects a second direction Y. A third direction Z intersects the first direction X and the second direction Y. For example, the first direction X, the second direction Y and the third direction Z are perpendicular to one another. However, they may intersect one another at an angle other than 90 degrees. In this specification, the direction of the arrow indicating the third direction Z is referred to as "upward" (or toward the upper side). The opposite direction of the arrow indicating the third direction Z is referred to as "downward" (or toward the lower side).

The display device DSP comprises a display panel PNL, circuit board (wiring substrates) F1 to F5, etc. The display panel PNL comprises a display area DA for displaying an image, and a frame-shaped non-display area NDA surrounding the display area DA. The non-display area NDA is located in the outside of the display area DA. Lines of n scanning lines G (G1 to Gn) and m signal lines S(S1 to Sm) are arranged in the non-display area NDA. Both n and m are positive integers, where n may be equal to m, or n may be different from m. The scanning lines G extend in the first direction X, and are arranged at intervals in the second direction Y. In other words, the scanning lines G extend in a row direction. The signal lines S extend in the second direction Y, and are arranged at intervals in the first direction X.

The display panel PNL comprises edges E1 and E2 extending in the first direction X, and edges E3 and E4 extending in the second direction Y. With respect to the width of the non-display area NDA, width W1 between the edge E1 and the display area DA in the second direction Y is less than width W2 between the edge E2 and the display area DA in the second direction Y. Width W3 between the edge E3 and the display area DA in the first direction X is substantially equal to width W4 between the edge E4 and the display area DA in the first direction X. Both width W3 and width W4 are less than width W2. Both width W3 and width W4 may be substantially equal to width W1, or may be different from width W1.

The circuit boards F1 to F3 are arranged in this order in the first direction X. The circuit board F1 comprises a gate driver GD1. The circuit board F2 comprises a source driver SD. The circuit board F3 comprises a gate driver GD2. The circuit boards F1 to F3 are coupled to the display panel PNL and the circuit board F4. The circuit board F5 comprises a timing controller TC, a power supply circuit PC, etc. The circuit board F4 is connected to a connector CT provided in the circuit board F5. The circuit boards F1 to F3 may be replaced by a single circuit board. The circuit boards F1 to F4 may be replaced by a single circuit board. The gate driver GD1, the gate driver GD2, the source driver SD and the timing controller TC constitute the controller of the present embodiment. The controller is configured to control the driving of a plurality of pixel electrodes, a common electrode and a light source unit as described later.

In the example shown in FIG. 1, the odd-numbered scanning lines G from the edge E1 side are connected to the gate driver GD2, and the even-numbered scanning lines G are connected to the gate driver GD1. However, the connection relationships of the gate drivers GD1 and GD2 and the scanning lines G are not limited to the example shown in FIG. 1.

FIG. 2 is a cross-sectional view of the display device DSP shown in FIG. 1. Here, this specification merely explains the main part of a section of the display device DSP in the Y-Z plane defined by the second direction Y and the third direction Z.

As shown in FIG. 2, the display panel PNL comprises a first substrate SUB1, a second substrate SUB2, a liquid crystal layer 30 as a display function layer, etc. The first substrate SUB1 comprises a transparent substrate 10, pixel electrodes 11, an alignment film 12, etc. The second substrate SUB2 comprises a transparent substrate 20, a common electrode 21, an alignment film 22, etc. The pixel electrodes 11 and the common electrode 21 are formed of a transparent conductive material such as indium tin oxide (ITO) or indium zinc oxide (IZO). The liquid crystal layer 30 is located at least in the display area DA. The liquid crystal layer 30 contains a polymer dispersed liquid crystal, and is located between the alignment films 12 and 22. The liquid crystal layer 30 of the present embodiment uses a reverse mode polymer dispersed liquid crystal (R-PDLC). The liquid crystal layer 30 maintains the parallelism of incident light when the applied voltage is low. The liquid crystal layer 30 scatters incident light when the applied voltage is high. The first substrate SUB1 is bonded to the second substrate SUB2 with a sealant 40. The first substrate SUB1 comprises an extension portion EX extending in the second direction Y in comparison with an edge E5 of the transparent substrate 20.

The circuit boards F1 to F3 are connected to the extension portion EX of the first substrate SUB1.

A light source unit LU comprises a light-emitting element LS, a circuit board F6, etc. The light-emitting element LS is connected to the circuit board F6, and is located on the extension portion EX. The light-emitting element LS comprises a light-emitting portion (light-emitting surface) EM facing the edge E5. As described later, the illumination light emitted from the light-emitting portion EM enters the edge E5, and is propagated through the display panel PNL.

FIG. 3 shows the main structural components of the display device DSP shown in FIG. 1.

As shown in FIG. 3, the display device DSP comprises a controller CNT. The controller CNT is indicated by a dashed line in FIG. 3. The controller CNT includes the timing controller TC, the gate drivers GD1 and GD2, the source driver SD, a Vcom circuit VC, a light source driver LSD, etc.

The timing controller TC generates various signals based on the image data and synchronization signals input from outside. For example, the timing controller TC outputs a video signal generated by a predetermined signal process to the source driver SD based on image data. The timing controller TC outputs a control signal generated based on a synchronization signal to the gate drivers GD1 and GD2, the source driver SD, the Vcom circuit VC and the light source driver LSD. The detail of the timing controller TC is explained later.

The display area DA indicated by the alternate long and two short dashes line in FIG. 3 comprises a plurality of pixels PX. Each pixel PX comprises a switching element SW and a pixel electrode 11. Each switching element SW is electrically connected to a corresponding scanning line G and a corresponding signal line S. The pixel electrodes 11 are located in the display area DA, and are arrayed in matrix. Thus, for example, the pixel electrodes 11 are provided in a plurality of rows. Each pixel electrode 11 is electrically connected to a corresponding signal line S via a corresponding switching element SW. The common electrode 21 is located in the display area DA. The common electrode 21 faces the pixel electrodes 11. In a manner different from that of the present embodiment, the common electrode 21 may be sectioned such that each section is based on at least one pixel PX. The sections may be connected to a common line such that common voltage is applied. A scanning signal is supplied to each scanning line G from the gate driver GD1 or GD2. A video signal is supplied to each signal line S from the source driver SD. Common voltage is applied to the common electrode 21 from the Vcom circuit VC. When a switching element SW is in a conduction state based on the scanning signal supplied to the scanning line G, the video signal supplied to the signal line S is supplied to the pixel electrode 11 connected to the switching element SW. In the following explanation, the generation of a potential difference between a pixel electrode 11 and the common electrode 21 by supplying a video signal to the pixel electrode 11 may be described as to write a video signal (or to apply voltage) to the pixel PX comprising the pixel electrode 11.

The light source unit LU is located outside the area facing the display area DA of the display panel PNL in the third direction Z. The light source unit LU is configured to emit light in a color other than achromatic colors to the liquid crystal layer 30. The light source unit LU comprises a plurality of light-emitting elements LS in a plurality of colors. For example, the light source unit LU comprises a light-emitting element (first light-emitting element) LSR which emits light in a first color to the liquid crystal layer 30, a light-emitting element (second light-emitting element) LSG which emits light in a second color to the liquid crystal layer 30, and a light-emitting element (third light-emitting element) LSB which emits light in a third color to the liquid crystal layer 30. As a matter of course, the first color, the second color and the third color are different from each other. In the present embodiment, the first color is red. The second color is green. The third color is blue. The light source driver LSD controls the lighting periods of the light-emitting elements LSR, LSG and LSB. As described in detail later, in a drive scheme in which each frame period comprises a plurality of sub-frame (field) periods, at least one of the three light-emitting elements LSR, LSG and LSB lights up in each sub-frame, and the color of the illumination light is switched based on each sub-frame.

Now, this specification explains a structural example of the display device comprising the liquid crystal layer 30 which is a polymer dispersed liquid crystal layer.

Figure 4A:
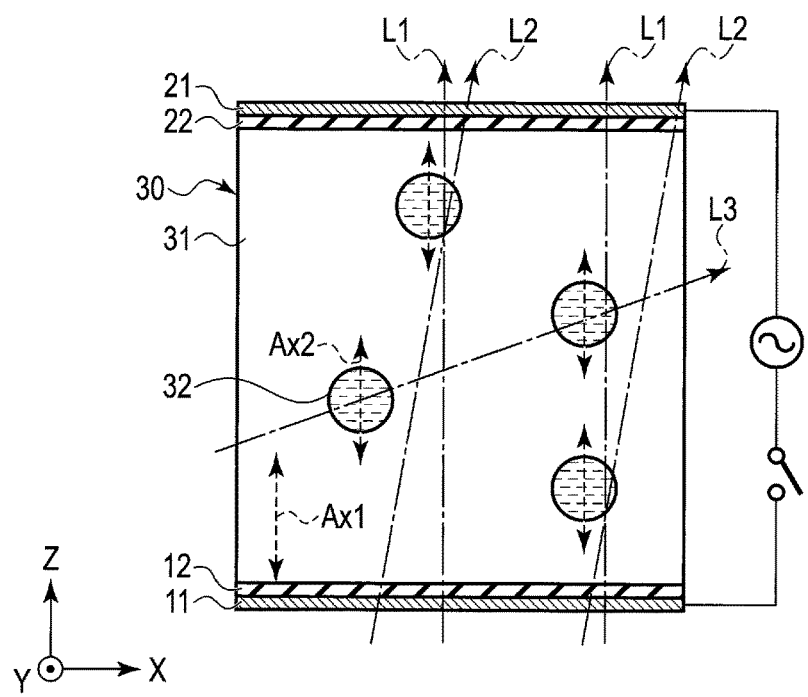
FIG. 4A schematically shows a liquid crystal layer in a transparent state.

FIG. 4A schematically shows the liquid crystal layer 30 in a transparent state.

As shown in FIG. 4A, the liquid crystal layer 30 contains a liquid crystal polymer 31 and liquid crystal molecules 32. The liquid crystal polymer 31 is obtained when, for example, liquid crystal monomers are polymerized in a state where the liquid crystal monomers are aligned in a predetermined direction by the alignment restriction force of the alignment films 12 and 22. The liquid crystal molecules 32 are dispersed in liquid crystal monomers. When the liquid crystal monomers are polymerized, the liquid crystal molecules 32 are aligned in a predetermined direction based on the alignment direction of the liquid crystal monomers. The alignment films 12 and 22 may be horizontal alignment films for aligning the liquid crystal monomers and the liquid crystal molecules 32 along the X-Y plane defined by the first direction X and the second direction Y, or may be vertical alignment films for aligning the liquid crystal monomers and the liquid crystal molecules 32 in the third direction Z.

The liquid crystal molecules 32 may be positive liquid crystal molecules having positive dielectric anisotropy, or may be negative liquid crystal molecules having negative dielectric anisotropy. The liquid crystal polymer 31 and the liquid crystal molecules 32 have the same optical anisotropy. Alternatively, the liquid crystal polymer 31 and the liquid crystal molecules 32 have substantially the same refractive anisotropy. Thus, the liquid crystal polymer 31 and the liquid crystal molecules 32 have substantially the same ordinary refractive index and substantially the same extraordinary refractive index. It should be noted that the ordinary refractive index or extraordinary refractive index of the liquid crystal polymer 31 may not be completely the same as that of the liquid crystal molecules 32. A difference made by a manufacturing error, etc., is allowed. The response property for an electric field differs between the liquid crystal polymer 31 and the liquid crystal molecules 32. The response property of the liquid crystal polymer 31 for an electric field is lower than the response property of the liquid crystal molecules 32 for an electric field.

The example shown in FIG. 4A is equivalent to, for example, a state in which voltage is not applied to the liquid crystal layer 30 (a state in which the potential difference between the pixel electrode 11 and the common electrode 21 is zero), or a state in which the second transparent voltage described later is applied to the liquid crystal layer 30.

As shown in FIG. 4A, optical axis Ax1 of the liquid crystal polymer 31 is parallel to optical axis Ax2 of each liquid crystal molecule 32. In the example shown in FIG. 4A, both optical axis Ax1 and optical axis Ax2 are parallel to the third direction Z. Here, each optical axis is equivalent to an axis parallel to the direction of travel of a light beam in which the refractive index takes a single value regardless of the direction of polarization.

As described above, the liquid crystal polymer 31 and the liquid crystal molecules 32 have substantially the same refractive anisotropy. Further, optical axis Ax1 is parallel to optical axis Ax2. Thus, in all directions including the first direction X, the second direction Y and the third direction Z, there is little difference in the refractive index between the liquid crystal polymer 31 and the liquid crystal molecules 32. Thus, light L1 entering the liquid crystal layer 30 in the third direction Z passes through the liquid crystal layer 30 with little scattering. The liquid crystal layer 30 is capable of maintaining the parallelism of light L1. Similarly, both light L2 and light L3 entering the liquid crystal layer 30 in a direction inclined with respect to the third direction Z are scattered very little in the liquid crystal layer 30. In this way, a high transparency can be obtained. The state shown in FIG. 4A is called a transparent state.

Figure 4B:
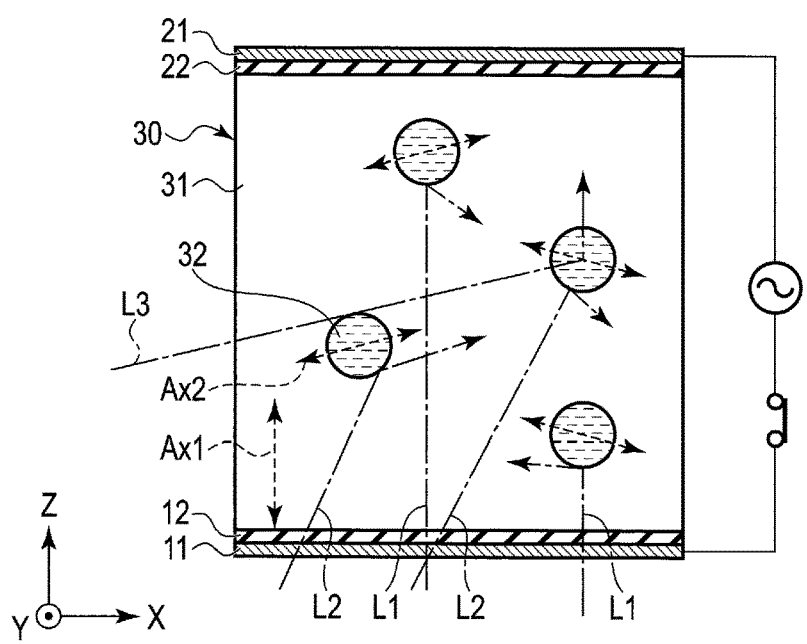
FIG. 4B schematically shows the liquid crystal layer in a scattering state.

FIG. 4B schematically shows the liquid crystal layer 30 in a scattering state.

As shown in FIG. 4B and described above, the response property of the liquid crystal polymer 31 for an electric field is lower than the response property of the liquid crystal molecules 32 for an electric field. Thus, in a state where voltage (the scattering voltage described later) higher than the second transparent voltage described above and the first transparent voltage described later is applied to the liquid crystal layer 30, the alignment direction of the liquid crystal polymer 31 hardly changes. However, the alignment direction of the liquid crystal molecules 32 is changed based on the electric field. As shown in FIG. 4B, optical axis Ax1 is substantially parallel to the third direction Z. However, optical axis Ax2 is inclined with respect to the third direction Z. Thus, optical axis Ax1 intersects optical axis Ax2. In all directions including the first direction X, the second direction Y and the third direction Z, the refractive index differs largely between the liquid crystal polymer 31 and the liquid crystal molecules 32. In this way, light L1 to light L3 entering the liquid crystal layer 30 are scattered in the liquid crystal layer 30. The state shown in FIG. 4B is called a scattering state.

FIG. 5A is a cross-sectional view showing the display panel PNL when the liquid crystal layer 30 is in a transparent state.

As shown in FIG. 5A, illumination light L11 emitted from the light-emitting element LS enters the display panel PNL through the edge E5, and is propagated through the transparent substrate 20, the liquid crystal layer 30, the transparent substrate 10, etc. When the liquid crystal layer 30 is in a transparent state, illumination light L11 is hardly scattered in the liquid crystal layer 30. Thus, illumination light L11 hardly leaks out of a lower surface 10B of the transparent substrate 10 and an upper surface 20T of the transparent substrate 20.

External light L12 entering the display panel PNL passes through the liquid crystal layer 30 with little scattering. The external light entering the display panel PNL through the lower surface 10B is emitted from the upper surface 20T. The external light entering the display panel PNL through the upper surface 20T is emitted from the lower surface 10B. Thus, when the user observes the display panel PNL from the upper surface 20T side, the user can view the background on the lower surface 10B side through the display panel PNL. Similarly, when the user observes the display panel PNL from the lower surface 10B side, the user can view the background on the upper surface 20T side through the display panel PNL.

FIG. 5B is a cross-sectional view showing the display panel PNL when the liquid crystal layer 30 is in a scattering state.

As shown in FIG. 5B, illumination light L21 emitted from the light-emitting element LS enters the display panel PNL through the edge E5, and is propagated through the transparent substrate 20, the liquid crystal layer 30, the transparent substrate 10, etc. In the example shown in FIG. 5B, as the liquid crystal layer 30 between a pixel electrode 11A and the common electrode 21 (in other words, the liquid crystal layer to which the voltage applied between the pixel electrode 11A and the common electrode 21 is applied) is in a transparent state, illumination light L21 is hardly scattered in, of the liquid crystal layer 30, the area facing the pixel electrode 11A. As the liquid crystal layer 30 between a pixel electrode 11B and the common electrode 21 (in other words, the liquid crystal layer to which the voltage applied between the pixel electrode 11B and the common electrode 21 is applied) is in a scattering state, illumination light L21 is scattered in, of the liquid crystal layer 30, the area facing the pixel electrode 11B. Of illumination light L21, partial scattered light L211 is emitted to outside from the upper surface 20T, and partial scattered light L212 is emitted to outside from the lower surface 10B.

In the position overlapping the pixel electrode 11A, external light L22 entering the display panel PNL passes through the liquid crystal layer 30 with little scattering in a manner similar to external light L12 shown in FIG. 5A. In the position overlapping the pixel electrode 11B, external light L23 entering the display panel PNL through the lower surface 10B is partially scattered in the liquid crystal layer 30. As a result, partial light L231 is emitted from the upper surface 20T. External light L24 entering the display panel PNL through the upper surface 20T is partially scattered in the liquid crystal layer 30. As a result, partial light L241 is emitted from the lower surface 10B.

Thus, when the user observes the display panel PNL from the upper surface 20T side, the user can view the color of illumination light L21 in the position overlapping the pixel electrode 11B. Since partial external light L231 passes through the display panel PNL, the user can also view the background on the lower surface 10B side through the display panel PNL. Similarly, when the user observes the display panel PNL from the lower surface 10B side, the user can view the color of illumination light L21 in the position overlapping the pixel electrode 11B. Since partial external light L241 passes through the display panel PNL, the user can also view the background on the upper surface 20T side through the display panel PNL. In the position overlapping the pixel electrode 11A, the liquid crystal layer 30 is in a transparent state. Thus, the color of illumination light L21 is hardly viewed. The user can view the background through the display panel PNL.

Figure 6:
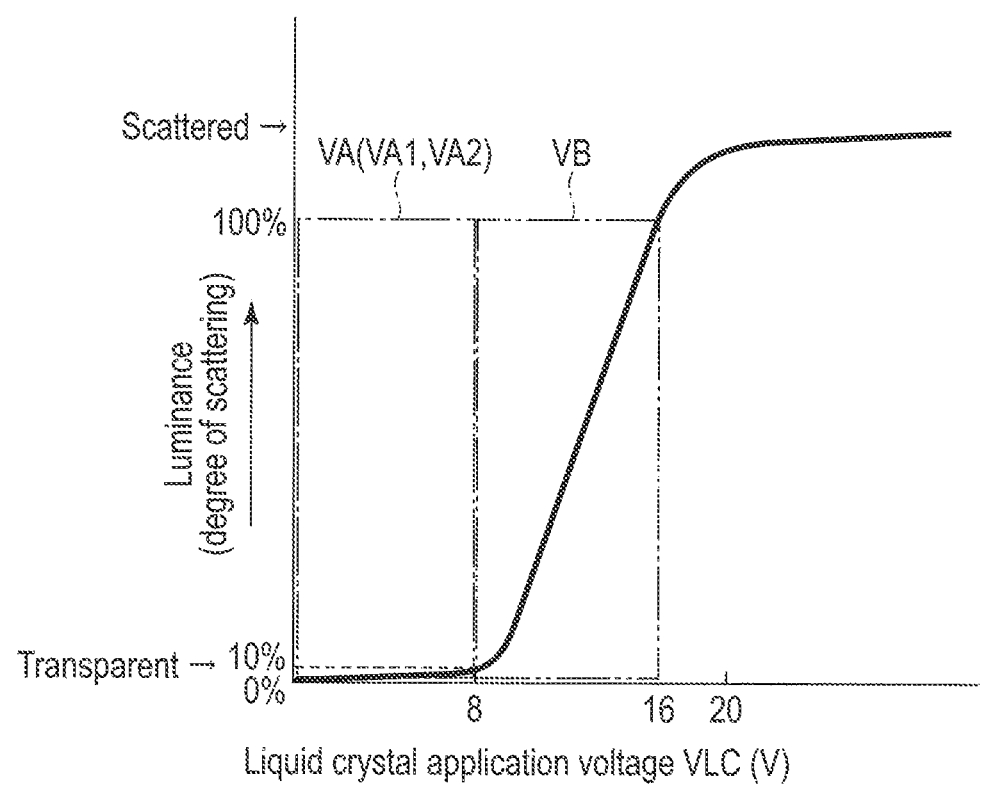
FIG. 6 is a graph showing the scattering property of the liquid crystal layer.

FIG. 6 is a graph showing the scattering property of the liquid crystal layer 30, and shows the relationship between voltage VLC applied to the liquid crystal layer 30 and the luminance. Here, as shown in, for example, FIG. 5B, the luminance is equivalent to the luminance of scattered light L211 obtained when illumination light L21 emitted from the light-emitting element LS is scattered in the liquid crystal layer 30. In another respect, the luminance indicates the degree of scattering of the liquid crystal layer 30.

As shown in FIG. 6, while voltage VLC is increased from 0 V, the luminance steeply rises in an area where voltage VLC exceeds approximately 8 V. When voltage VLC reaches approximately 20 V, the luminance is saturated. When voltage VLC is between 0 V and 8 V, the luminance is slightly increased. In the present embodiment, the voltage in the range surrounded by the alternate long and two short dashes line, in other words, the range between 8 V and 16 V, is used for the gradation of each pixel PX (for example, 256 levels). Hereinafter, the voltage of 8 V<VLC≤16 V is referred to as scattering voltage. In the present embodiment, the voltage in the range surrounded by the alternate long and short dash line, in other words, the voltage of 0 V≤VLC≤8 V, is referred to as transparent voltage. Transparent voltage VA includes the first transparent voltage VA1 and the second transparent voltage VA2 described above. The lower and upper limits of scattering voltage VB and the lower and upper limits of transparent voltage VA are not limited to the example explained here. They may be arbitrarily determined based on the scattering property of the liquid crystal layer 30.

The highest degree of scattering of the light entering the liquid crystal layer 30 when scattering voltage VB is applied to the liquid crystal layer 30 is assumed to be 100%. Here, the degree of scattering when 16 V of scattering voltage VB is applied to the liquid crystal layer 30 is 100%. For example, the range of transparent voltage VA may be defined as the range of voltage VLC in which the degree of scattering (luminance) is less than 10%. Alternatively, transparent voltage VA may be defined as voltage VLC less than or equal to voltage (8 V in the example of FIG. 6) corresponding to the minimum gradation.

Transparent voltage VA (including the first transparent voltage VA1 and the second transparent voltage VA2) may be different from the example shown in FIG. 6. For example, the first transparent voltage VA1 may be voltage in which the degree of scattering is greater than or equal to 10% and less than or equal to 50%. The second transparent voltage VA2 may be voltage in which the degree of scattering is less than 10%.

The graph shown in FIG. 6 is applicable when the polarity of the voltage applied to the liquid crystal layer 30 is either positive (+) or negative (−). In the latter case, voltage VLC is the absolute value of negative voltage.

Figure 7A:
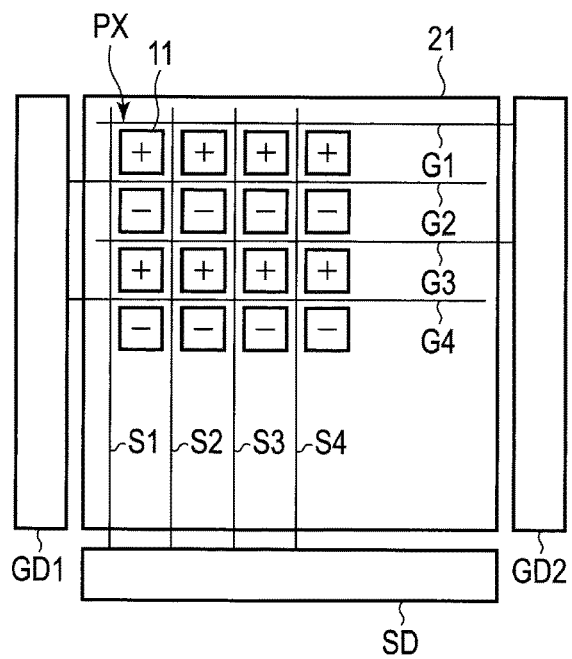
FIG. 7A shows the outline of a one-line inversion drive scheme.
Figure 7B:
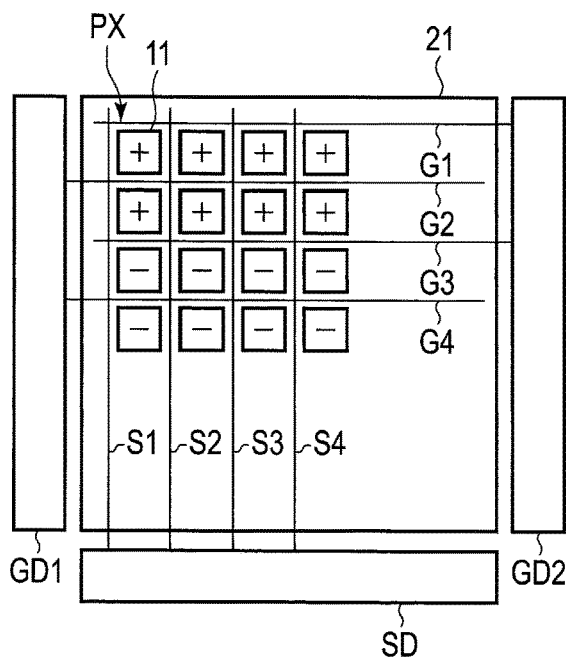
FIG. 7B shows the outline of a two-line inversion drive scheme.
Figure 7C:
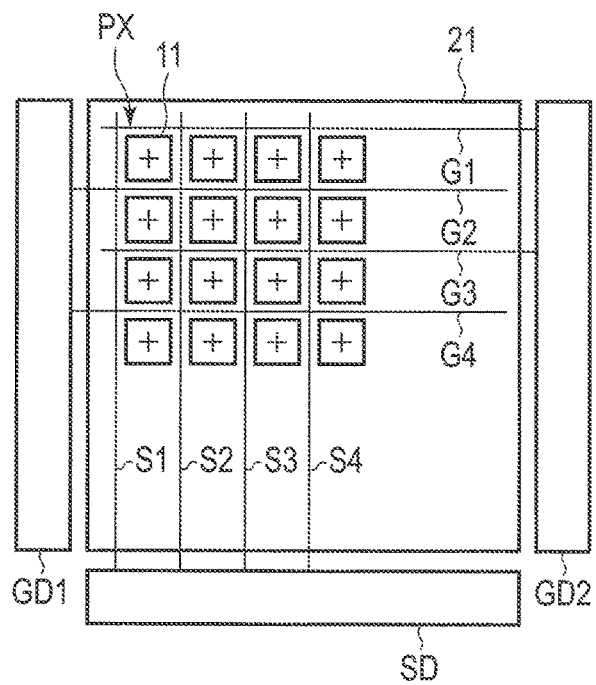
FIG. 7C shows the outline of a frame-inversion drive scheme.

Polarity inversion drive scheme for inverting the polarity of the voltage applied to the liquid crystal layer 30 may be applied to the display device DSP. FIG. 7A, FIG. 7B and FIG. 7C show the outline of polarity inversion drive scheme.

FIG. 7A shows a one-line-inversion drive scheme for inverting the voltage applied to the liquid crystal layer 30 (in other words, the voltage written to the pixels PX) between positive polarity (+) and negative polarity (−) for the group of pixels PX connected to each scanning line G (in other words, for each pixel line). In this drive method, for example, the polarity of the common voltage applied to the common electrode 21 and the polarity of the video signal supplied from the source driver SD to the signal lines S (in other words, the polarity of signal line voltage) are inverted for each horizontal period in which the gate drivers GD1 and GD2 supply a scanning signal to the scanning lines G. In the same horizontal period, the polarity of common voltage is, for example, opposite to that of a video signal.

FIG. 7B shows a two-line-inversion drive scheme for inverting the voltage applied to the liquid crystal layer 30 between positive polarity (+) and negative polarity (−) for every two consecutive lines. The present embodiment is not limited to the examples of FIG. 7A and FIG. 7B. The polarity may be inverted for every three or more lines.

FIG. 7C shows a frame-inversion drive scheme for inverting the voltage applied to the liquid crystal layer 30 between positive polarity (+) and negative polarity (−) for each frame period in which an image is displayed based on image data. In this drive method, for example, the polarity of common voltage and the polarity of a video signal are inverted for each frame period. In the same frame period, the polarity of common voltage is, for example, opposite to that of a video signal.

Figure 8:
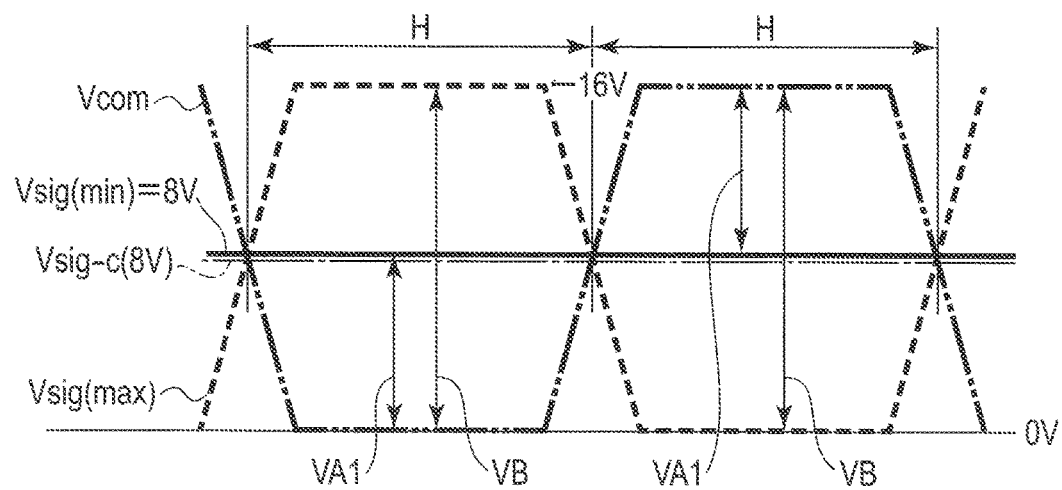
FIG. 8 shows an example of common voltage and signal line voltage in display scanning.

FIG. 8 shows an example of common voltage Vcom applied to the common electrode 21 and signal line voltage Vsig applied to the signal lines S (or the pixel electrodes 11) in display scanning to which the one-line-inversion drive scheme shown in FIG. 7A is applied.

With respect to signal line voltage Vsig, FIG. 8 shows a waveform corresponding to the maximum value (max) of gradation and a waveform corresponding to the minimum value (min) of gradation. Here, the waveform of signal line voltage Vsig (min) is indicated by a solid line. The waveform of common voltage Vcom is indicated by an alternate long and two short dashes line. The waveform of signal line voltage Vsig (max) is indicated by a dashed line. In the example of FIG. 8, the polarity of common voltage Vcom and the polarity of signal line voltage Vsig (see the waveform of the maximum value) are inverted for each horizontal period H. Reference voltage Vsig-c is, for example, 8 V. In each of common voltage Vcom and signal line voltage Vsig, the lower limit is 0 V, and the upper limit is 16 V.

The present embodiment is not limited to the example shown in FIG. 8. With respect to polarity inversion drive scheme including the example of FIG. 9 described later, when the voltage applied to the liquid crystal layer 30 (in other words, the voltage written to each pixel PX) is positive, the difference between signal line voltage Vsig and common voltage Vcom (Vsig−Vcom) is 0 V or positive voltage. When the voltage applied to the liquid crystal layer 30 (in other words, the voltage written to each pixel PX) is negative, the difference between signal line voltage Vsig and common voltage Vcom (Vsig−Vcom) is 0 V or negative voltage.

With respect to the polarity inversion drive scheme shown in FIG. 8, in a period for writing positive voltage to each pixel PX, common voltage Vcom is 0 V, and signal line voltage Vsig is based on the gradation indicated by image data in the range greater than or equal to 8 V and less than or equal to 16 V. In a period for writing negative voltage to each pixel PX, common voltage Vcom is 16 V, and signal line voltage Vsig is based on the gradation indicated by image data in the range greater than or equal to 0 V and less than or equal to 8 V. In either case, voltage greater than or equal to 8 V and less than or equal to 16 V is applied between the common electrode 21 and the pixel electrodes 11.

As shown in FIG. 6, even when voltage VLC applied to the liquid crystal layer 30 is 8 V, in other words, even when the first transparent voltage VA1 is applied to the liquid crystal layer 30, the degree of scattering of the liquid crystal layer 30 is approximately 0% to 10%. Even when signal line voltage Vsig is the minimum value of gradation, the external light entering the display panel PNL is slightly scattered. Thus, the visibility of the background of the display panel PNL may be decreased.

As described later, the visibility of the background of the display panel PNL can be improved by incorporating transparent scanning in which the voltage between the pixel electrodes 11 and the common electrode 21 is less than, for example, the lower limit of gradation (in other words, the scanning in a reset period as described later) into the sequence of image display.

Now, this specification explains the relationship between the output of the source driver SD and common voltage Vcom.

Because of the restriction on the withstand voltage of the source driver SD, etc., the source driver SD cannot simultaneously output positive signal line voltage Vsig (for example, reference voltage Vsig-c to 16 V) and negative signal line voltage Vsig (for example, 0 V to reference voltage Vsig-c). Thus, the polarity of common voltage Vcom is set to the opposite polarity of the output of the source driver SD.

However, when the withstand voltage of the source driver SD is high, signal line voltage Vsig and common voltage Vcom may have either the above relationship or the following relationship. Common voltage Vcom is fixed at 0 V. Signal line voltage Vsig output from the source driver SD is 0 to +16 V when the polarity is positive. Signal line voltage Vsig is −16 to 0 V when the polarity is negative.

Figure 9:
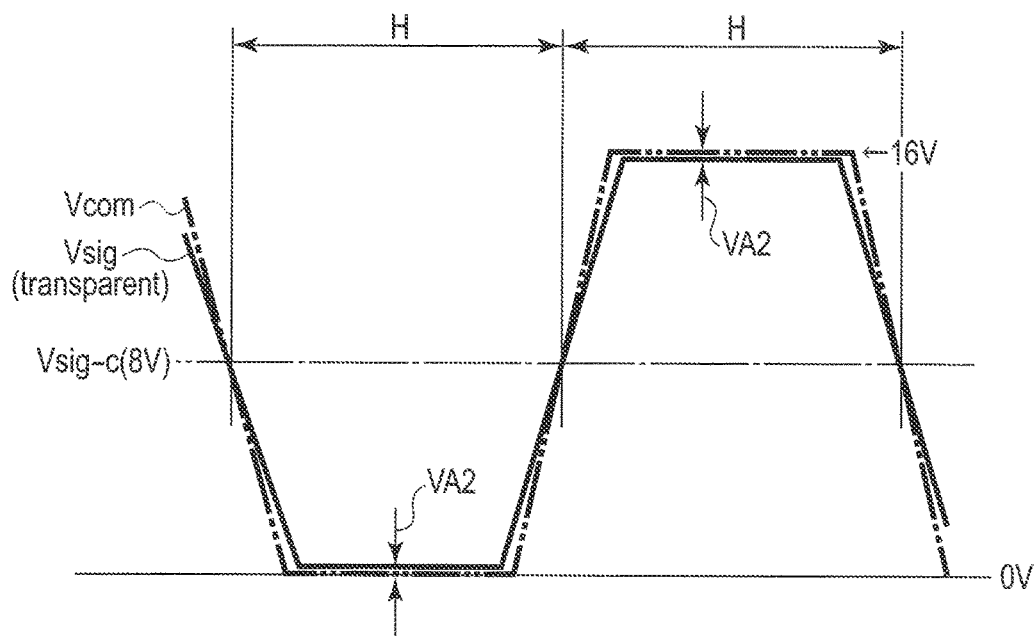
FIG. 9 shows an example of common voltage and signal line voltage in transparent scanning.

FIG. 9 shows an example of common voltage Vcom and signal line voltage Vsig in transparent scanning. Here, the waveform of signal line voltage Vsig is indicated by a solid line. The waveform of common voltage Vcom is indicated by an alternate long and two short dashes line.

As shown in FIG. 9, in a manner similar to that of FIG. 8, common voltage Vcom is alternately switched to 0 V and 16 V for each horizontal period H. In transparent scanning, signal line voltage Vsig matches common voltage Vcom (Vsig=Vcom=0 V or Vsig=Vcom=16 V) for each horizontal period H. In FIG. 9, signal line voltage Vsig and common voltage Vcom are shown such that they are slightly different from each other for the sake of convenience. Thus, 0 V is applied to the liquid crystal layer 30. In other words, the second transparent voltage VA2 is applied to the liquid crystal layer 30.

Note that signal line voltage Vsig in transparent scanning is not limited to the example shown in FIG. 9. For example, in a period in which common voltage Vcom is 0 V, signal line voltage Vsig may be greater than 0 V and less than 8 V (0 V<Vsig<8 V). In a period in which common voltage Vcom is 16 V, signal line voltage Vsig may be greater than 8 V and less than 16 V (8 V<Vsig<16 V). In either case, in transparent scanning, the absolute value of the difference between signal line voltage Vsig and common voltage Vcom is less than 8 V, thereby increasing the parallelism of the light passing through the liquid crystal layer 30. In other words, the second transparent voltage VA2 is not limited to 0 V. The absolute value of the second transparent voltage VA2 may be less than 8 V.

In transparent scanning, the voltage applied to the liquid crystal layer 30 should be less than the lower limit (for example, 8 V) of gradation. Signal line voltage Vsig may not completely match common voltage Vcom. As described above, the highest degree of scattering of the light entering the liquid crystal layer 30 when scattering voltage VB is applied to the liquid crystal layer 30 is assumed to be 100%. For example, the second transparent voltage VA2 is preferably voltage in which the degree of scattering is less than 10%.

Figure 10:
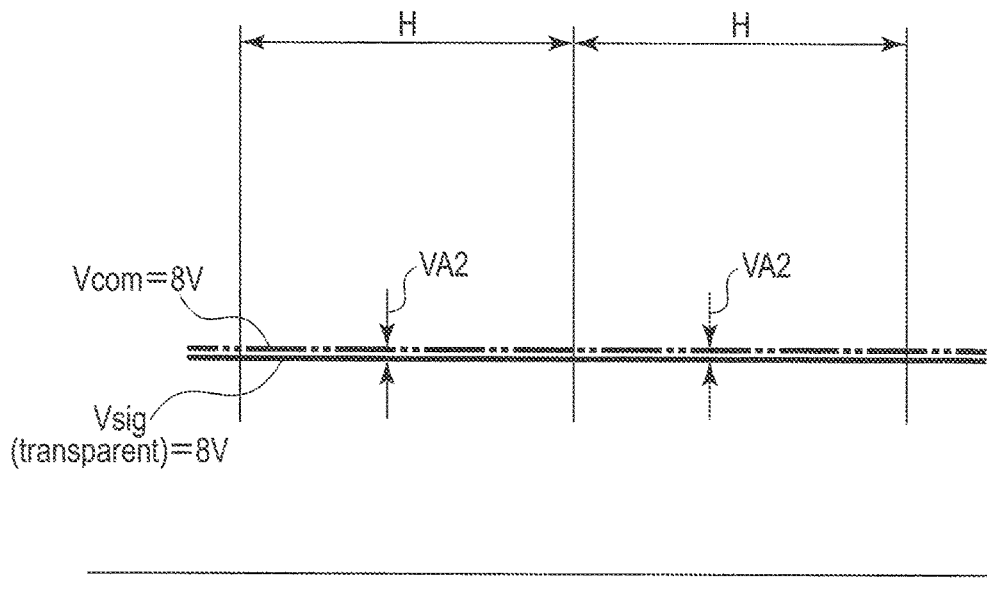
FIG. 10 shows another example of common voltage and signal line voltage in transparent scanning.

FIG. 10 shows another example of common voltage Vcom and signal line voltage Vsig in transparent scanning. Here, the waveform of signal line voltage Vsig is indicated by a solid line. The waveform of common voltage Vcom is indicated by an alternate long and two short dashes line.

As shown in FIG. 10, in this example, in transparent scanning, the polarity inversion of common voltage Vcom and signal line voltage Vsig is stopped. Further, common voltage Vcom matches signal line voltage Vsig at 8 V (that is, the above reference voltage Vsig-c). Common voltage Vcom may match signal line voltage Vsig at voltage other than reference voltage Vsig-c, for example, at 0 V. In a manner similar to that of FIG. 9, the second transparent voltage VA2 is preferably voltage in which the degree of scattering is less than 10%.

In the above description, transparent scanning is explained with the example of a one-line-inversion drive scheme. However, the same transparent scanning can be applied to two-line and more-line-inversion drive schemes and a frame-inversion drive scheme.

Now, this specification explains a control example of the display device DSP into which transparent scanning is incorporated, referring to FIG. 11 to FIG. 18. Here, a drive system in which each frame period comprises a plurality of sub-frame (field) periods is applied to the display device DSP. This drive system is called, for example, a field sequential system. In each sub-frame period, a red, green or blue image is displayed. The images of the respective colors displayed by time division are viewed by the user as an image of multicolor display.

FIG. 11 shows a configuration example of the timing controller TC shown in FIG. 3.

As shown in FIG. 11, the timing controller TC comprises a timing generation unit 50, a frame memory 51, line memories 52R, 52G and 52B, a data conversion unit 53, a light source controller 54, a detector 55 which is an address detector, etc.

The frame memory 51 stores image data for one frame input from outside. The line memories 52R, 52G and 52B store red, green and blue sub-frame data, respectively. The sub-frame data indicates the red, green or blue image (for example, the gradation value of each pixel PX) to be displayed in the pixels PX by time division. The sub-frame data of each color stored in the line memories 52R, 52G and 52B corresponds to the frame which is one frame before the image data stored in the frame memory 51. The data conversion unit 53 generates a video signal by applying various data conversion processes such as gamma correction to the sub-frame data of each color stored in the line memories 52R, 52G and 52B, and outputs the generated video signal to the above source driver SD. The timing controller TC may be configured to sort data into RGB data in the frame memory 51 and transmit RGB data to the data conversion unit 53. In this case, the timing controller TC may be structured without the line memories 52R, 52G and 52B.

The light source controller 54 outputs a light source control signal to the above light source driver LSD. The light source driver LSD drives the light-emitting elements LSR, LSG and LSB based on the light source control signal. The light-emitting elements LSR, LSG and LSB may be driven by, for example, pulse width modulation (PWM) control. The light source driver LSD is capable of adjusting the luminance of the light-emitting elements LSR, LSG and LSB by the duty ratio of the signals output to the light-emitting elements LSR, LSG and LSB.

The timing generation unit 50 controls the operation timing of the frame memory 51, the line memories 52R, 52G and 52B, the data conversion unit 53 and the light source controller 54 in synchronization with a vertical synchronization signal Vsync and a horizontal synchronization signal Hsync input from outside. The timing generation unit 50 controls the source driver SD by outputting a source driver control signal, and controls the gate drivers GD1 and GD2 by outputting a gate driver control signal. The timing generation unit 50 outputs a Vcom control signal.

When the data of a character is included in the image data for one frame input from outside, the detector 55 is configured to detect the address of the data of the character. As the character, for example, the letter, figure or icon to be displayed in a part of the display area DA is considered. A case where the data of a character is included in image data refers to a case where at least one position of all the bits of digital data includes data other than 0. The address information of the data of the character is provided to the data conversion unit 53. Thus, when the data of a character is included in the image data input from outside, the timing controller TC is capable of generating a processed video signal and outputting it to the source driver SD to adjust the degree of scattering (transparency) of the area other than the area which displays the character. A processed video signal may be generated by the operation of the data conversion unit 53 or by using the data stored in a table 56 of the timing controller TC.

Now, this specification explains an example for adjusting the degree of scattering (transparency) of the area other than the area which displays a character.

As shown in FIG. 12, it is assumed that the user views the character "B" of the character string "ABC" described in the background through the display device DSP. When the characters CH1 of the character string "BBB" are simply displayed in the display area DA, the characters CH1 may overlap the character "B" of the background. Thus, the user may not be able to easily view (identify) the characters CH1. The present embodiment provides a technology for allowing the user to easily view the characters CH1 even when the characters CH1 overlap the character "B" of the background. Alternatively, the present embodiment provides a technology for preventing the effect of the background on the user.

In the display area DA, the area for displaying the characters CH1 is defined as a first area A1. In the present embodiment, the characters CH1 are three characters arranged at intervals. Thus, the first area A1 is a discontinuous area. In the display area DA, the area at least including the entire area of the rows in which the first area A1 is located is defined as an object area OA. In the present embodiment, the object area OA includes the entire area of the rows in which the first area A1 is located, the entire area of some rows on the edge E1 side in comparison with the first area A1, and the entire area of some rows on the edge E2 side in comparison with the first area A1. In this example, the object area OA is set at the edge of the display area DA on the edge E1 side. In the object area OA, the area other than the first area A1 is defined as a second area A2. The first area A1 is an area corresponding to the pixels to which scattering voltage greater than or equal to a predetermined voltage of the gradation voltage is applied. The second area A2 is an area corresponding to the pixels to which the first transparent voltage is applied. The first transparent voltage is in a predetermined range in the vicinity of voltage for allowing gradation reproduction of gradation voltage. In the display area DA, the area other than the object area OA is defined as a non-object area NOA. As described above, scattering voltage or the first transparent voltage is applied to the pixels provided in the object area OA. The second transparent voltage is applied to the pixels provided in the non-object area NOA.

Figure 13B:
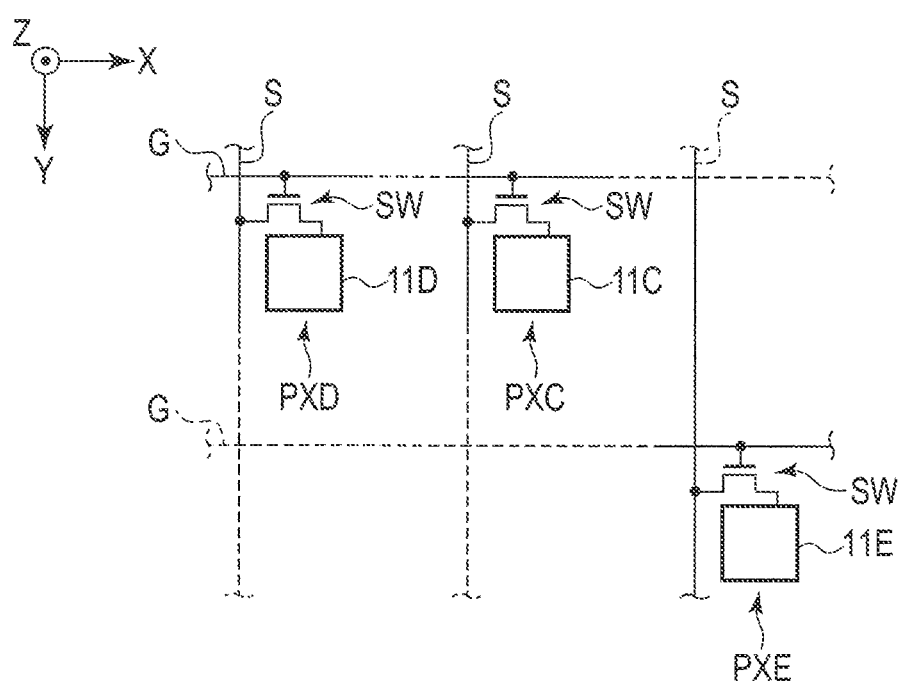
FIG. 13B shows an equivalent circuit showing the connection relationships of the pixel electrodes, scanning lines, signal lines and switching elements shown in FIG. 13A.

FIG. 13A only shows, of the display panel PNL, a portion necessary for explanation. FIG. 13A shows paths of light, a state in which light is diffused in the liquid crystal layer 30, and a state in which the parallelism of light is maintained in the liquid crystal layer 30. FIG. 13B shows the connection relationships of the pixel electrodes 11, the scanning lines G, the signal lines S and the switching elements SW shown in FIG. 13A.

As shown in FIG. 13A and FIG. 13B, the pixel electrodes 11 include a first pixel electrode 11C located in the first area A1, a second pixel electrode 11D located in the second area A2, and a third pixel electrode 11E located in the non-object area NOA. For example, the first pixel electrode 11C and the second pixel electrode 11D are electrically connected to the same scanning line G of the scanning lines G. The third pixel electrode 11E is electrically connected to another scanning line G of the scanning lines G. Each pixel electrode 11 is connected to the gate electrode of a corresponding switching element SW, and is electrically connected to a corresponding scanning line G via the switching element SW.

The liquid crystal layer (display function layer) 30 includes a first liquid crystal layer (first display function layer) 30C to which the voltage applied between the first pixel electrode 11C and the common electrode 21 is applied, a second liquid crystal layer (second display function layer) 30D to which the voltage applied between the second pixel electrode 11D and the common electrode 21 is applied, and a third liquid crystal layer (third display function layer) 30E to which the voltage applied between the third pixel electrode 11E and the common electrode 21 is applied. In the present embodiment, the first liquid crystal layer 30C is interposed between the first pixel electrode 11C and the common electrode 21. The second liquid crystal layer 30D is interposed between the second pixel electrode 11D and the common electrode 21. The third liquid crystal layer 30E is interposed between the third pixel electrode 11E and the common electrode 21.

The pixels PX include a first pixel PXC, a second pixel PXD and a third pixel PXE. The first pixel PXC includes the first pixel electrode 11C, the first liquid crystal layer 30C, etc. The second pixel PXD includes the second pixel electrode 11D, the second liquid crystal layer 30D, etc. The third pixel PXE includes the third pixel electrode 11E, the third liquid crystal layer 30E, etc.

The liquid crystal layer 30 (including the first liquid crystal layer 30C, the second liquid crystal layer 30D and the third liquid crystal layer 30E) scatters incident light when the above scattering voltage is applied. The liquid crystal layer 30 maintains the parallelism of incident light when the first transparent voltage is applied. The liquid crystal layer 30 maintains the parallelism of incident light when the second transparent voltage is applied.

The parallelism of the light passing through the liquid crystal layer 30 when the second transparent voltage is applied is higher than that when the first transparent voltage is applied. The parallelism of the light passing through the liquid crystal layer 30 when the first transparent voltage is applied is higher than that when the above scattering voltage is applied.

The degree of scattering of the light passing through the liquid crystal layer 30 when the above scattering voltage is applied is higher than that when the first transparent voltage is applied. The degree of scattering of the light passing through the liquid crystal layer 30 when the first transparent voltage is applied is higher than that when the second transparent voltage is applied.

As shown in FIG. 12 and FIG. 13A, when the characters CH1 are displayed in the first area A1 of the display area DA, the controller of the present embodiment applies a color other than achromatic colors to the first area A1, makes the second area A2 transparent, and makes the non-object area NOA transparent. The transparency of the non-object area NOA is higher than that of the second area A2. In the present embodiment, a reverse mode polymer dispersed liquid crystal is used for the liquid crystal layer 30. Thus, the first transparent voltage is higher than the second transparent voltage. Scattering voltage is higher than the first transparent voltage. Note that, in a manner different from that of the present embodiment, when a normal mode polymer dispersed liquid crystal is used for the liquid crystal layer 30, the first transparent voltage is higher than scattering voltage, and the second transparent voltage is higher than the first transparent voltage.

Thus, the controller applies scattering voltage to the first liquid crystal layer 30C, applies the first transparent voltage to the second liquid crystal layer 30D and applies the second transparent voltage to the third liquid crystal layer 30E. With respect to a frame period of the period in which the characters CH1 are displayed in the first area A1, the controller drives the light source unit LU to irradiate the liquid crystal layer 30 with light. While the liquid crystal layer 30 is irradiated with light, the controller applies scattering voltage to the first liquid crystal layer 30C, applies the first transparent voltage to the second liquid crystal layer 30D, and applies the second transparent voltage to the third liquid crystal layer 30E.

The color of the characters CH1 (in other words, the color applied to the first area A1) is based on the color emitted by the light source unit LU. The controller is capable of displaying the characters CH1 in the single color emitted by the light source unit LU or a mixture of the plurality of colors emitted by the light source unit LU. The characters CH1 may be displayed in a single color or may be displayed in different colors depending on each portion.

The degree of scattering of the light of the first liquid crystal layer 30C is higher than that of the second liquid crystal layer 30D and the third liquid crystal layer 30E. The first liquid crystal layer 30C is in a scattering state. Thus, when the background is viewed through the display panel PNL, the visibility of the background can be the lowest in the first area A1.

The parallelism of the light passing through the third liquid crystal layer 30E is higher than that of the light passing through the first liquid crystal layer 30C and the second liquid crystal layer 30D. The third liquid crystal layer 30E is in a transparent state. Thus, when the background is viewed through the display panel PNL, the visibility of the background is the highest in the non-object area NOA.

The second liquid crystal layer 30D is also in a transparent state. The degree of scattering of the light passing through the second liquid crystal layer 30D is higher than that of the light passing through the third liquid crystal layer 30E. When the background is viewed through the display panel PNL, the background blurs in the second area A2. The visibility of the background in the second area A2 can be decreased. Thus, the user can easily view the characters CH1.

Now, this specification explains another example for adjusting the degree of scattering (transparency) of the area other than the area which displays a character.

Figure 14A:
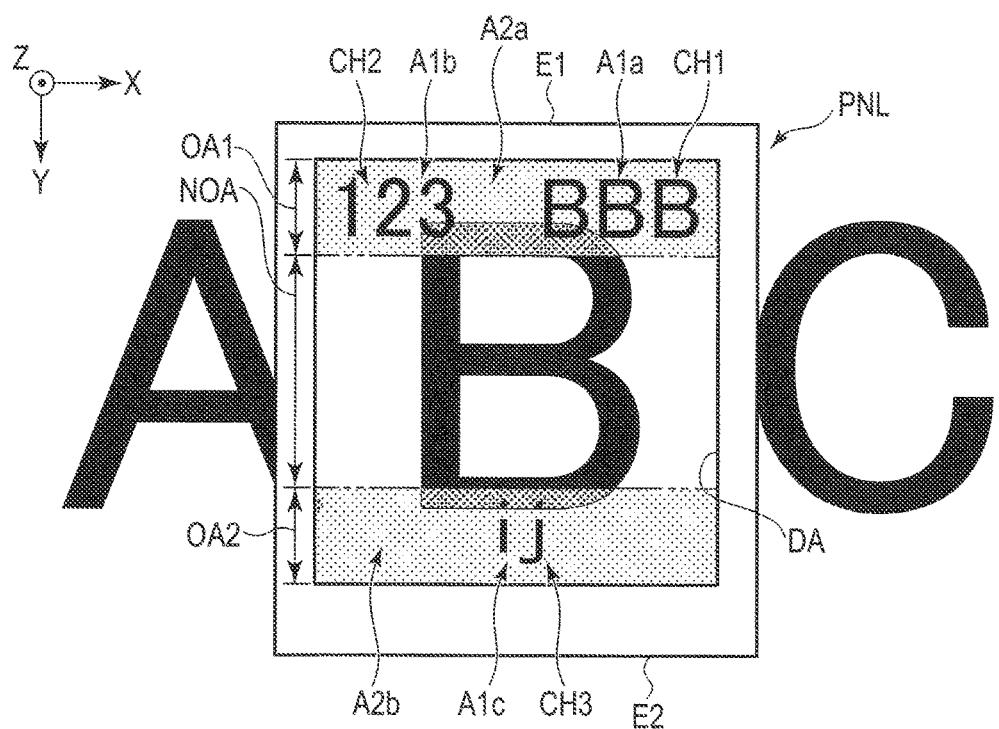
FIG. 14A shows another usage example of the display device, and is a plan view of the display panel showing a state in which characters are displayed in two object areas.

As shown in FIG. 14A, it is assumed that the user views the character "B" described in the background through the display device DSP in a manner similar to that of the example of FIG. 12. The display area DA may include a plurality of object areas OA. Each object area OA may comprise a plurality of first areas A1. In this case, a plurality of groups of characters CH can be displayed in each object area OA.

In the display area DA, the area for displaying the characters CH1 of the character string "BBB" is a first area A1a. In the display area DA, the area for displaying the characters CH2 of the character string "123" is a first area A1b. In the display area DA, the area at least including the entire area of the rows in which the first areas A1a and A1b are located is an object area OA1. In the present embodiment, the object area OA1 includes the entire area of the rows in which the first areas A1a and A1b are located, the entire area of some rows on the edge E1 side in comparison with the first areas A1a and A1b, and the entire area of some rows on the edge E2 side in comparison with the first areas A1a and A1b. In the object area OA1, the area other than the first areas A1a and A1b is a second area A2a.

In the display area DA, the area for displaying the characters CH3 of the character string "ij" is a first area A1c. In the display area DA, the area at least including the entire area of the rows in which the first area A1c is located is an object area OA2. In the present embodiment, the object area OA2 includes the entire area of the rows in which the first area A1c is located, the entire area of some rows on the edge E1 side in comparison with the first area A1e, and the entire area of some rows on the edge E2 side in comparison with the first area A1c.

Figure 14B:
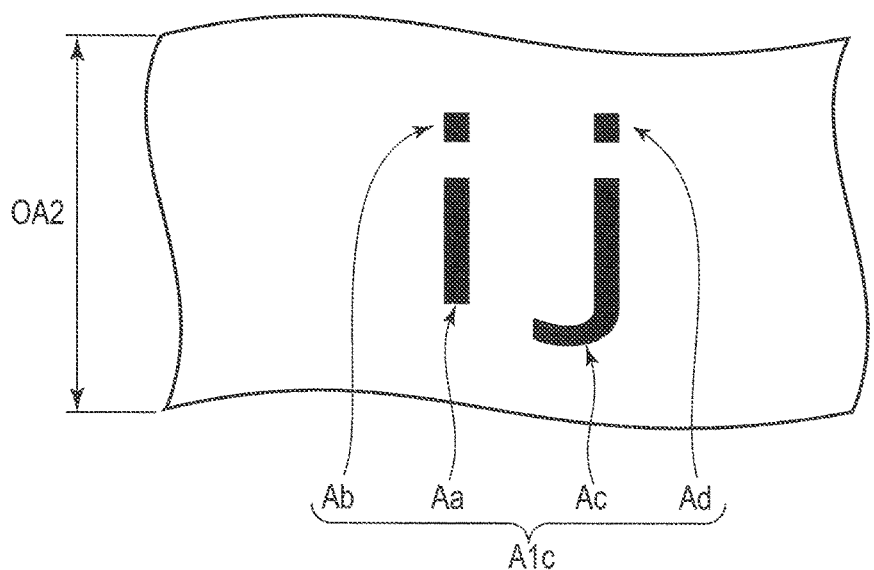
FIG. 14B is an enlarged plan view showing a part of the display area shown in FIG. 14A.

As shown in FIG. 14A and FIG. 14B, in this example, the first area A1c includes four discontinuous areas with spaces in the first and second directions X and Y. Specifically, the first area A1c includes the lower area Aa of "i", the upper area Ab of "i", the lower area Ac of "j", and the upper area Ad of "j". In this case, the rows located in the gap in the second direction Y in the first area A1c can be also included in the object area OA2 by the operation of the data conversion unit 53 or by using the data stored in the table 56. In the object area OA2, the area other than the first area A1c is a second area A2b. In this example, the object area OA1 is set at the edge of the display area DA on the edge E1 side. The object area OA2 is set at the edge of the display area DA on the edge E2 side. In the display area DA, the area other than the object areas OA1 and OA2 is the non-object area NOA.

When the characters CH1 are displayed in the first area A1a, and the characters CH2 are displayed in the first area A1b, and the characters CH3 are displayed in the first area A1e, the controller of the present embodiment applies a color other than achromatic colors to the first areas A1a, A1b and A1c, makes the second areas A2a and A2b transparent, and makes the non-object area NOA transparent. Thus, the controller applies scattering voltage to the pixels provided in the first areas A1a, A1b and A1c, applies the first transparent voltage to the pixels provided in the second areas A2a and A2b, and applies the second transparent voltage to the pixels provided in the non-object area NOA. The transparency of the non-object area NOA is higher than that of the second areas A2a and A2b.

In this case, similarly, the color of the characters CH1, CH2 and CH3 may be either a single color or a mixed color. The color may differ depending on the characters CH1, CH2 and CH3. The characters CH1, CH2 and CH3 may be displayed in different colors depending on each portion. When the background is viewed through the display panel PNL, the visibility of the background in the second areas A2a and A2b can be decreased. Thus, the user can easily view the characters CH1, CH2 and CH3.

Now, this specification explains common voltage Vcom and signal line voltage Vsig when the characters CH1, CH2 and CH3 are displayed in the display area DA.

As described above, signal line voltage Vsig which can be simultaneously output by the source driver SD is positive signal line voltage Vsig or negative signal line voltage Vsig. Positive signal line voltage Vsig is reference voltage Vsig-c (8 V) to 16 V. Negative signal line voltage Vsig is 0 V to reference voltage Vsig-c (8 V). Thus, positive signal line voltage Vsig or negative signal line voltage Vsig is applied to the pixels PX of the same row. To the pixels PX provided in the object areas OA1 and OA2, only positive signal line voltage Vsig is applied in a period in which common voltage Vcom is 0 V, and only negative signal line voltage Vsig is applied in a period in which common voltage Vcom is 16 V.

To the pixels PX provided in the non-object area NOA, 0 V of signal line voltage Vsig is applied in a period in which common voltage Vcom is 0 V, and 16 V of signal line voltage Vsig is applied in a period in which common voltage Vcom is 16 V.

Figure 15:
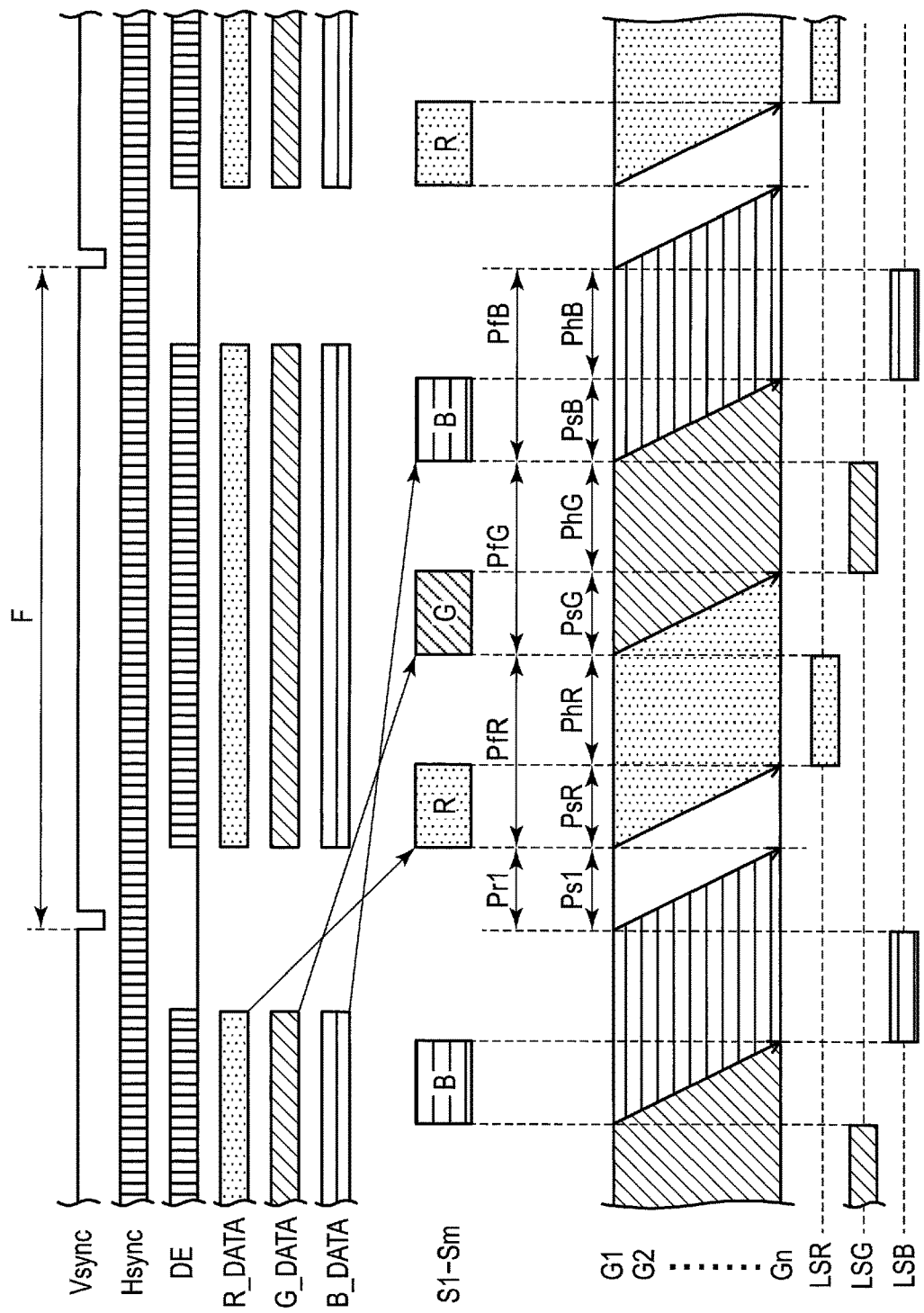
FIG. 15 is a timing chart showing an example of display operation.

FIG. 15 is a timing chart showing an example of display operation.

As shown in FIG. 15, a vertical synchronization signal Vsync falls when a frame is started. In this example, the period which starts with the falling in a vertical synchronization signal Vsync and continues until the signal falls again is equivalent to a frame period F. For example, when the display device DSP is driven at 60 Hz, each frame period F is approximately 16.7 ms.

Each frame period F includes a first reset period Pr1 for performing the above transparent scanning, a first sub-frame period PfR, a second sub-frame period PfG and a third sub-frame period NB. Each sub-frame period Pf is equivalent to a period for performing the above display scanning. In this example, the first reset period Pr1 is the head period of each frame period F. The first reset period Pr1, the first sub-frame period PfR, the second sub-frame period PfG and the third sub-frame period PfB come in this order. However, in a manner different from that of this example, the first reset period Pr1 may be the last period of each frame period F instead of the head period of each frame period F.

In the first reset period Pr1, transparent scanning is performed under the control of the timing controller TC. The gate drivers GD1 and GD2 supply a scanning signal to the scanning lines G1 to Gn in series. While a scanning signal is supplied, the source driver SD applies, for example, signal line voltage Vsig equal to common voltage Vcom to the signal lines S1 to Sm. By this operation, the second transparent voltage is written between the pixel electrodes 11 of all the pixels PX and the common electrode 21. The pixel electrode 11 of each pixel PX is electrically in a floating state until a next scanning signal is supplied to a corresponding scanning line G after a scanning signal is supplied to the scanning line G. Thus, the second transparent voltage is retained in each pixel PX to which the second transparent voltage is written until a next scanning signal is supplied to a corresponding scanning line G.

In each pixel PX to which the second transparent voltage is written, the liquid crystal layer 30 is in a good transparent state. Thus, the visibility of the background of the display panel PNL is improved. In the present embodiment, all of the light-emitting elements LSR, LSG and LSB are turned off in the first reset period Pr1. The light-emitting elements LSR, LSG and LSB are preferably turned off in the first reset period Pr1. However, they may light up in the first reset period Pr1.

The signal line voltage Vsig supplied to the signal lines S1 to Sm in the first reset period Pr1 is not necessarily equal to common voltage Vcom as long as the voltage written to each pixel PX is the second transparent voltage. The various forms explained with reference to FIG. 9 and FIG. 10 may be applied to common voltage Vcom and signal line voltage Vsig in transparent scanning.

In the first reset period Pr1, the period for supplying a scanning signal to the scanning lines G1 to Gn in series is a scanning period Ps1. In this example, the first sub-frame period PfR comes immediately after the scanning period Ps1. Thus, with respect to the time period, the first reset period Pr1 is equal to the scanning period Ps1. The first reset period Pr1 may include a retention period for further retaining the second transparent voltage after the scanning period Ps1.

In transparent scanning, a scanning signal may be simultaneously supplied to all the scanning lines G. Even in this case, the second transparent voltage can be written to each pixel PX.

The first sub-frame period PfR, the second sub-frame period PfG and the third sub-frame period NB come in this order. However, the order of these sub-frame periods Pf may be different from that of this example. In the sub-frame periods Pf, the timing generation unit 50 performs the display scanning of each color by controlling the frame memory 51, the line memories 52R, 52G and 52B and the data conversion unit 53 with a data synchronization signal DE and using the detector 55 and the table 56.

The first sub-frame period PfR includes a scanning period PsR and a retention period PhR. In the scanning period PsR, the gate drivers GD1 and GD2 supply a scanning signal to the scanning lines G1 to Gn in series. Further, while a scanning signal is supplied, the source driver SD applies signal line voltage Vsig to the signal lines S1 to Sm in accordance with the red sub-frame data (R DATA) stored in the line memory 52R. More specifically, an operation for simultaneously applying, to the signal lines S1 to Sm, signal line voltage Vsig having a gradation corresponding to each pixel PX of each line to which a scanning signal is supplied is repeated. Signal line voltage Vsig is applied to the pixel electrodes 11 of pixels PX corresponding to the selected scanning line G via the switching elements SW. Subsequently, the switching elements SW are switched to a non-conduction state. Thus, the potential of the pixel electrodes 11 is retained. Subsequently, the scanning line G of the next row is selected. Similar drive is applied in series. Note that the signal line voltage Vsig applied to the second pixels PXD located in the second areas A2, A2a and A2b is reference voltage Vsig-c, and is adjusted to, for example, 8 V (see FIG. 8).

By this operation, voltage is written between the pixel electrode 11 and the common electrode 21 of each pixel PX in accordance with red sub-frame data. In each sub-frame period Pf, the signal line voltage Vsig applied to each pixel electrode 11 through the signal lines S1 to Sm has a polarity different from that of the common voltage Vcom of the common electrode 21, or is reference voltage Vsig-c. Thus, the absolute value of the voltage written to each pixel PX is greater than or equal to 8 V and less than or equal to 16 V. The retention period PhR is a period which starts after the completion of writing to all the pixels PX and continues until the second sub-frame period PfG comes. In the retention period PhR, the light-emitting element LSR emits red light. Thus, a red image is displayed in the display area DA.

The operation in the second sub-frame period PfG and the third sub-frame period PfB is the same as that in the first sub-frame period PfR. The second sub-frame period PfG includes a scanning period PsG and a retention period PhG. In the scanning period PsG, voltage is applied to each pixel PX in accordance with the green sub-frame data (G_DATA) stored in the line memory 52G In the retention period PhG, the light-emitting element LSG emits green light. In this way, a green image is displayed in the display area DA. The third sub-frame period PfB includes a scanning period PsB and a retention period PhB. In the scanning period PsB, voltage is applied to each pixel PX in accordance with the blue sub-frame data (B_DATA) stored in the line memory 52B. In the retention period PhB, the light-emitting element LSB emits blue light. In this way, a blue image is displayed in the display area DA.

In a frame period F, the image data to be displayed in the next frame period F is written to the frame memory 51. Further, the sub-frame data of the line memories 52R, 52G and 52B in which writing to the pixels PX is completed is rewritten in sub-frame data corresponding to the image data written to the frame memory 51.

As the red, green and blue images displayed by time division in the first sub-frame period PfR, the second sub-frame period PfG and the third sub-frame period PfB are mixed, the images are viewed as an image of multicolor display by the user. In the first reset period Pr1, the second transparent voltage is applied between the pixel electrode 11 and the common electrode 21 of each pixel PX. By repeating the first reset period Pr1 for each frame, the transparency of the display area DA is increased, thereby improving the visibility of the background of the display area DA.

The transparency of the display area DA is increased with increasing proportion of the first reset period Pr1 to each frame period F. However, the visibility of an image may be decreased. In consideration of these factors, the length of the first reset period Pr1 is preferably, for example, less than or equal to half the length of each frame period F. However, when a significance is placed on transparency, the proportion of the first reset period Pr1 to each frame period F may be further increased. The first sub-frame period PfR, the second sub-frame period PfG and the third sub-frame period PfB may have, for example, the same length. The color chromaticity of the image to be displayed may be adjusted by differentiating the proportions of the first sub-frame period PfR, the second sub-frame period PfG and the third sub-frame period PfB from each other.

Now, this specification explains the display operation of each frame period when the characters CH1 are displayed as shown in FIG. 12, using the display operation of FIG. 15.

As shown in FIG. 12, FIG. 13 and FIG. 15, in the first reset period Pr1, the controller applies the second transparent voltage to the first liquid crystal layer 30C, the second liquid crystal layer 30D and the third liquid crystal layer 30E, and switches the light source unit LU to a turn-off state in which the liquid crystal layer 30 is not irradiated with light. In all of the first sub-frame period PfR, the second sub-frame period PfG and the third sub-frame period NB, the controller applies the first transparent voltage to the second liquid crystal layer 30D and applies the second transparent voltage to the third liquid crystal layer 30E. In at least one of the first sub-frame period PfR, the second sub-frame period PfG and the third sub-frame period PfB, the controller applies scattering voltage to the first liquid crystal layer 30C.

Now, this specification explains a case where polarity inversion drive scheme is applied to the above display operation.

As shown in FIG. 12, FIG. 13 and FIG. 15, scattering voltage comprises positive scattering voltage and negative scattering voltage (see FIG. 8). Positive scattering voltage is, for example, 8 to 16 V. Negative scattering voltage is, for example, −8 to −16 V. When the characters CH1 are displayed in the first area A1, the controller alternately applies positive scattering voltage and negative scattering voltage to the first liquid crystal layer 30C depending on the frame period. At this time, the controller alternately applies the positive first transparent voltage and the negative first transparent voltage to the second liquid crystal layer 30D depending on the frame period. At this time, the controller applies the second transparent voltage to the third liquid crystal layer 30E in each frame period.

The absolute values of the positive first transparent voltage and the negative first transparent voltage are half the maximum value of the positive scattering voltage and half the maximum value of the absolute value of the negative scattering voltage, respectively. In the example shown in FIG. 8, the absolute values of the positive first transparent voltage and the negative first transparent voltage are 8 V. The maximum value of positive scattering voltage and the maximum value of the absolute value of negative scattering value are 16 V. For example, regardless of the polarity of the first transparent voltage and scattering voltage, the absolute value of the first transparent voltage is half the maximum value of the absolute value of scattering voltage. However, the present embodiment is not limited to the above example. The positive and negative first transparent voltages have to be voltages in which the degree of scattering is less than or equal to 50%.

Now, this specification explains display operation different from the display operation shown in FIG. 15. For example, each frame period may include a plurality of reset periods Pr. FIG. 16 is a timing chart showing an example of display operation in which each frame period F includes a plurality of reset periods Pr.

As shown in FIG. 16, each frame period F includes the first reset period Pr1, and further includes a second reset period Pr2 and a third reset period Pr3. The second reset period Pr2 is between the first sub-frame period PfR and the second sub-frame period PfG. The third reset period Pr3 is between the second sub-frame period PfG and the third sub-frame period PfB.

In this case, in the second reset period Pr2 and the third reset period Pr3, the controller of the present embodiment applies the second transparent voltage to the first liquid crystal layer 30C, the second liquid crystal layer 30D and the third liquid crystal layer 30E, and switches the light source unit LU to a turn-off state in which the liquid crystal layer 30 is not irradiated with light.

The first reset period Pr1, the second reset period Pr2 and the third reset period Pr3 may have, for example, the same length. However, they may have different lengths. To achieve both the transparency and the visibility of an image, the total length of the three reset periods Pr is preferably less than or equal to half the length of the frame period F. However, when a significance is placed on transparency, the proportion of each reset period Pr to each frame period F may be further increased.

Figure 17:
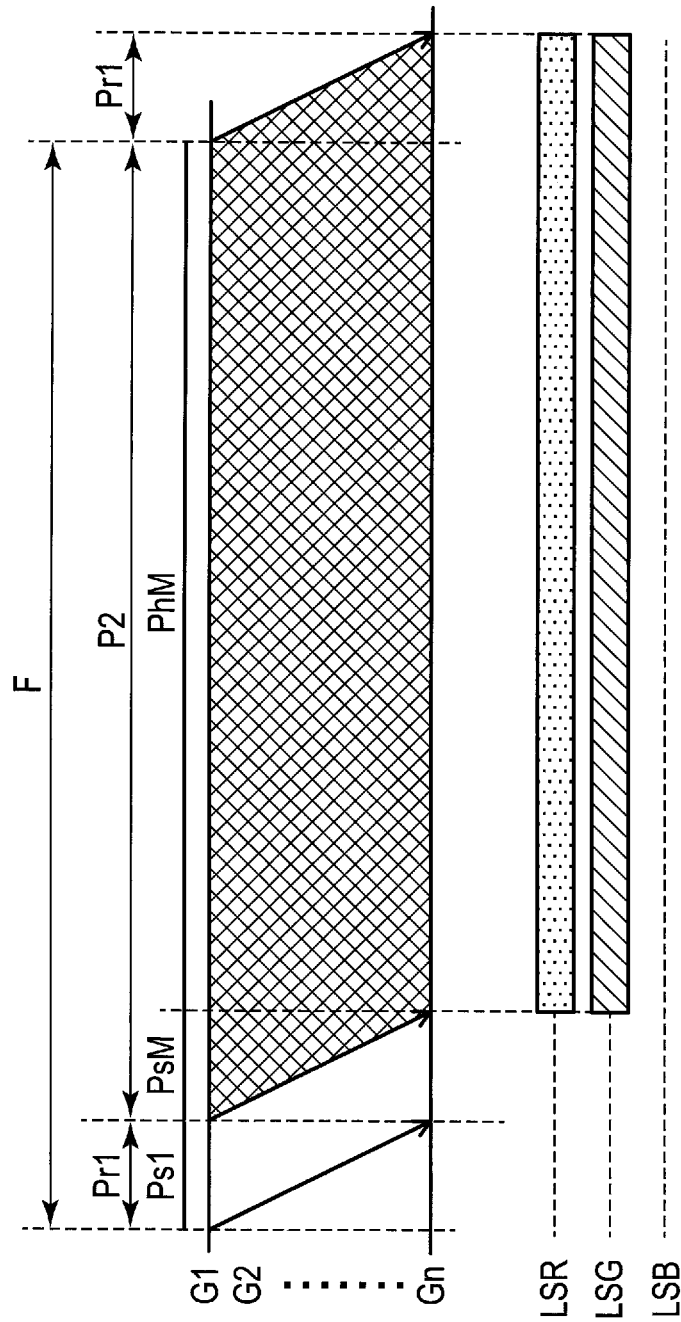
FIG. 17 is a timing chart showing another example of display operation.

The display device DSP may perform display operation using a single color as well as a field sequential system. FIG. 17 is a timing chart showing an example of display operation using the single color.

As shown in FIG. 17, in this example, each frame period F includes the first reset period Pr1. This structure is common to the example shown in FIG. 17 and the example shown in FIG. 15. Each frame period F includes a second period P2 for performing display scanning in place of the first sub-frame period PfR, the second sub-frame period PfG and the third sub-frame period PfB. The second period P2 includes a scanning period PsM and a retention period PhM. In the scanning period PsM, voltage is written to each pixel PX in accordance with image data. In the retention period PhM, the voltage written to each pixel PX is retained.

Further, in the retention period PhM, light-emitting elements LS corresponding to the color of the image to be displayed light up. As shown in FIG. 17, the light-emitting elements LS may continue to light up until the scanning of the scanning lines G1 to Gn in the first reset period Pr1 of the next frame period F is completed. Alternatively, the light-emitting elements LS may continue to light up only during the retention period PhM.

In the example of FIG. 17, the red light-emitting element LSR and the green light-emitting element LSG light up. In this way, yellow as a light source color is obtained by mixing red and green. A yellow image is displayed in the display area DA. As the light-emitting elements LS are driven by the above PWM control, the colors of the light-emitting elements LS lighting up at the same time can be adjusted, thereby realizing various light source colors. For example, the lighting period of the green light-emitting element LSG can be shorter than the lighting period of the red light-emitting element LSR in each frame period. In display scanning, only one of the light-emitting elements LSR, LSG and LSB may light up. Alternatively, the three light-emitting elements may light up at the same time.

The display device DSP may use display operation different from the display operation shown in FIG. 15 and FIG. 16. For example, as shown in FIG. 18, each frame period may not include the reset period Pr.

The display device DSP may be configured to switch the display operation shown in FIG. 15 to FIG. 18 based on, for example, the control signal input from outside. The display device DSP may be set in advance so as to perform the display operation shown in one of FIG. 15 to FIG. 18.

Now, this specification explains the process performed by the detector 55 shown in FIG. 11.

Figure 19:
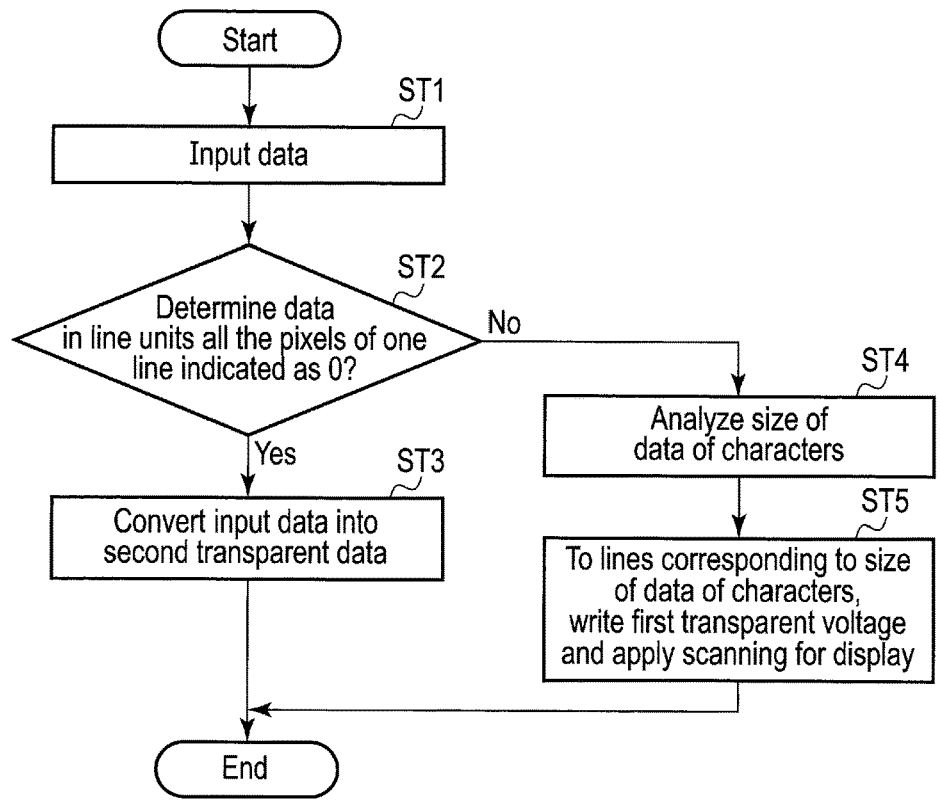
FIG. 19 is a flowchart showing the process of the detector of FIG. 11.

As shown in FIG. 19, when the process of the detector 55 is started, data is input to the detector 55 in step ST1. Subsequently, the process proceeds to step ST2. In step ST2, the detector 55 determines the data input in line units, and determines whether or not all the pixels of one line are indicated as 0. In other words, the detector 55 determines whether or not the voltage to be written to all the pixels PX of one row is the second transparent voltage. Further, in other words, the detector 55 determines whether or not data is applicable to the non-display area NOA.

When the detector 55 determines that all the pixels PX of one line are indicated as 0, the process proceeds to step ST3. The detector 55 converts the data input in step ST3 into the second transparent data, and the process of the detector 55 is terminated. The second transparent data is data for setting the voltage written to all the pixels PX of one row to voltage less than 8 V for common voltage Vcom (in other words, voltage in which the degree of scattering is less than 10% when the maximum degree of scattering is 100%). The voltage written to all the pixels PX (all the pixel electrodes) of one row preferably matches common voltage Vcom.

When the detector 55 determines that all the pixels PX of one line are not indicated as 0, in other words, when the detector 55 determines that the data is applicable to the object area OA, the process proceeds to step ST4. In step ST4, the detector 55 analyzes the size of the data of the characters to be displayed in the display area DA. Subsequently, in step ST5, the detector 55 writes the first transparent voltage to the pixels PX of lines corresponding to the size of the data of the characters or applies scanning for displaying the characters to these pixels PX. Subsequently, the process of the detector 55 is terminated. This first transparent voltage is equivalent to the above first transparent voltage VA1. The above scanning for displaying the characters is equivalent to writing the above scattering voltage to the pixels provided in the first area A1.

According to the display device DSP of the first embodiment having the above structure, the user can easily view the characters CH1, or the user is less affected by the background when the user views the characters CH1. In this way, it is possible to obtain the display device DSP capable of improving the visibility of the background and the display quality.

In the structure of the present embodiment, the display device DSP can be driven by using a source driver SD in which the withstand voltage is low. This effect is explained with reference to FIG. 6 and FIG. 8.

This specification assumes a comparison example in which common voltage Vcom is DC voltage, and polarity inversion is applied to only signal line voltage Vsig based on common voltage Vcom as the center. In this case, when signal line voltage Vsig is equal to common voltage Vcom, 0 V of voltage can be applied to the liquid crystal layer 30 of each pixel area in normal display scanning. However, in this comparison example, to use the scattering voltage of FIG. 6 for gradation reproduction, signal line voltage Vsig must be variable in a range of −16 V to +16 V relative to common voltage Vcom. The circuits such as the source driver SD need to have a withstand voltage of 32 V.

In the structure of the present embodiment, as shown in FIG. 8, signal line voltage Vsig and common voltage Vcom may be variable in a range of, for example, 16 V. Thus, a withstand voltage of 16 V is sufficient for the circuits such as the source driver SD. By decreasing the withstand voltage of the circuits, the sizes of the circuits and the manufacturing costs can be reduced.

Various desirable effects can be obtained from the present embodiment other than the above description.

Modification Example 1 of First Embodiment

Now, this specification explains modification example 1 of the first embodiment.

Figure 20:
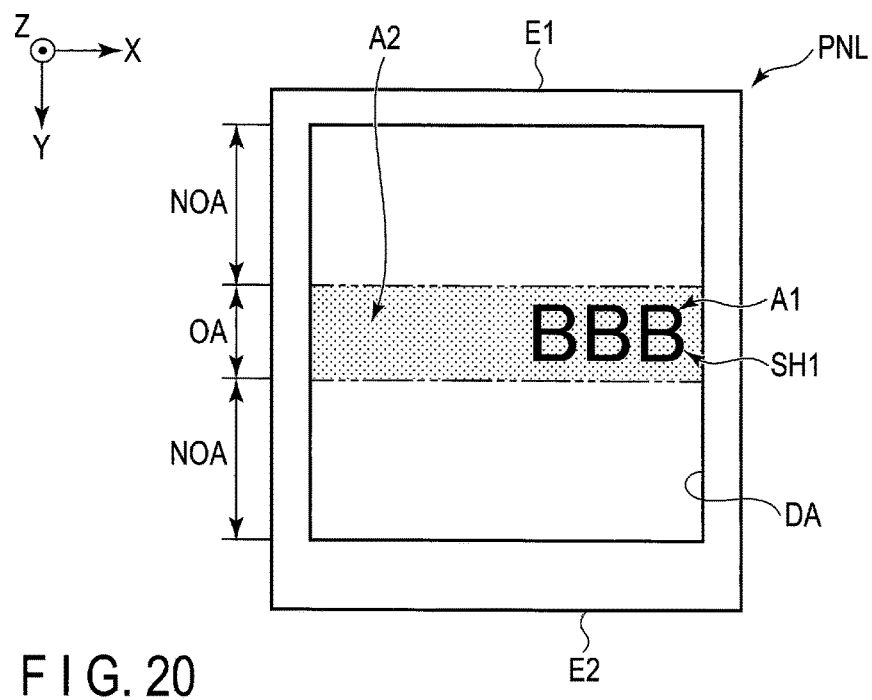
FIG. 20 shows a usage example of the display device of modification example 1 of the first embodiment, and is a plan view of the display panel showing a state in which characters are displayed in a single object area.

As shown in FIG. 20, the characters CH1 may be displayed in, of the display area DA, the area other than the edge in the second direction Y. In this example, the object area OA is the central area of the display area DA in the second direction Y. The area on the edge E1 side in comparison with the object area OA and the area on the edge E2 side in comparison with the object area OA are the non-object areas NOA.

Figure 21:
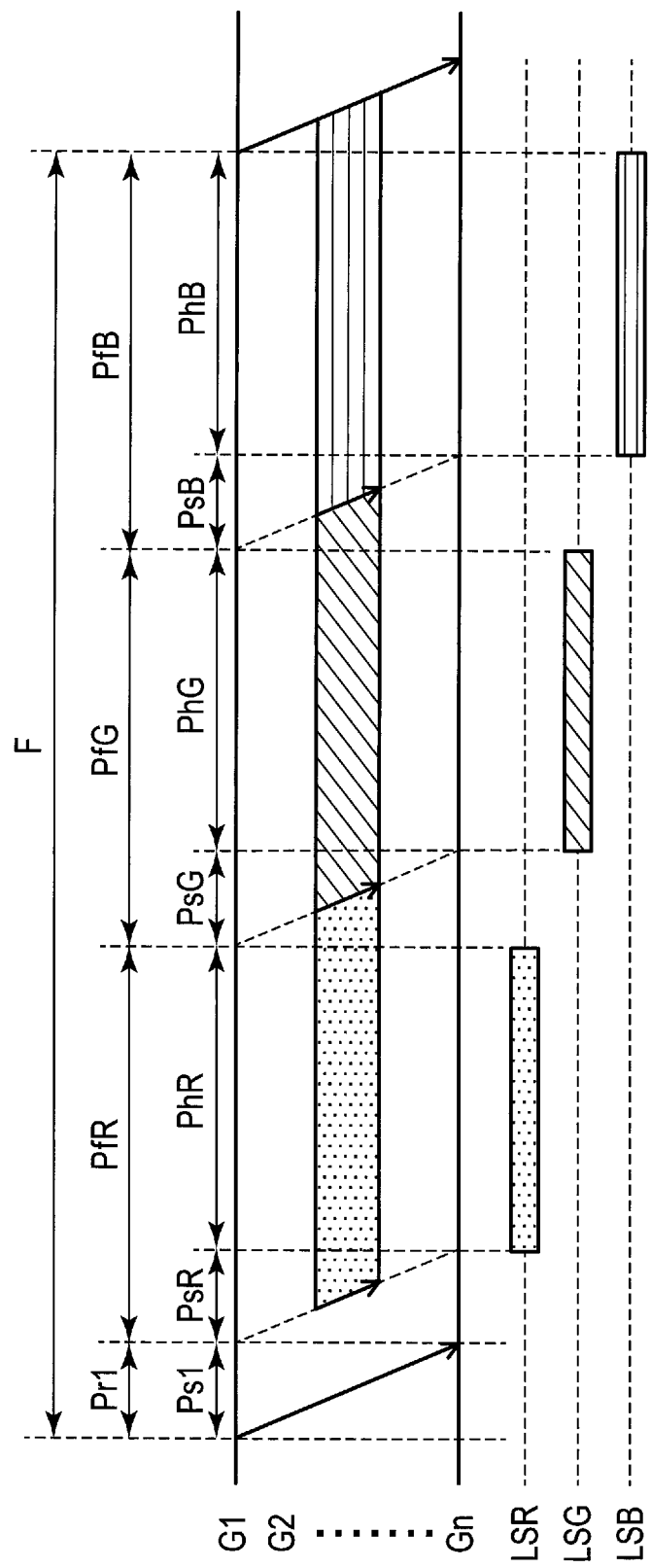
FIG. 21 is a timing chart showing an example of the display operation of the display device of modification example 1.

Now, this specification explains the display operation of each frame period for displaying the characters CH1 as shown in FIG. 20, using the display operation of FIG. 21.

As shown in FIG. 21, FIG. 13 and FIG. 20, each frame period F includes the first reset period Pr1, the first sub-frame period PfR, the second sub-frame period PfG and the third sub-frame period PfB. In the first reset period Pr1, the controller applies the second transparent voltage to the first liquid crystal layer 30C, the second liquid crystal layer 30D and the third liquid crystal layer 30E, and switches the light source unit LU to an off-state in which the liquid crystal layer 30 is not irradiated with light.

The controller does not drive all the scanning line G electrically connected to the pixels PX provided in the non-object areas NOA in any one of the first sub-frame period PfR, the second sub-frame period PfG and the third sub-frame period NB. In this period, the controller drives all the scanning lines G electrically connected to the pixels PX provided in the object area OA, and applies scattering voltage or the first transparent voltage to corresponding pixels PX. In the first reset period, the potential difference between the common electrode 21 and the pixel electrodes 11 is set to the second transparent voltage, and the switching elements SW maintain an off-state without driving the scanning lines G provided in the non-object areas NOA. Thus, in these portions, a transparent state is maintained.

In the example shown in FIG. 21, only pixels PX corresponding to the object area OA should be selectively driven. The scanning lines G provided in the non-object areas NOA may not be driven. The signal lines S may not be driven in any one of the scanning periods Ps. Thus, the drive power of the display device DSP can be reduced.

Modification Example 2 of First Embodiment

Now, this specification explains modification example 2 of the first embodiment. When the characters CH1 shown in FIG. 20 are displayed, the display device DSP may perform display operation using a single light source color as well as a field sequential system.

Figure 22:
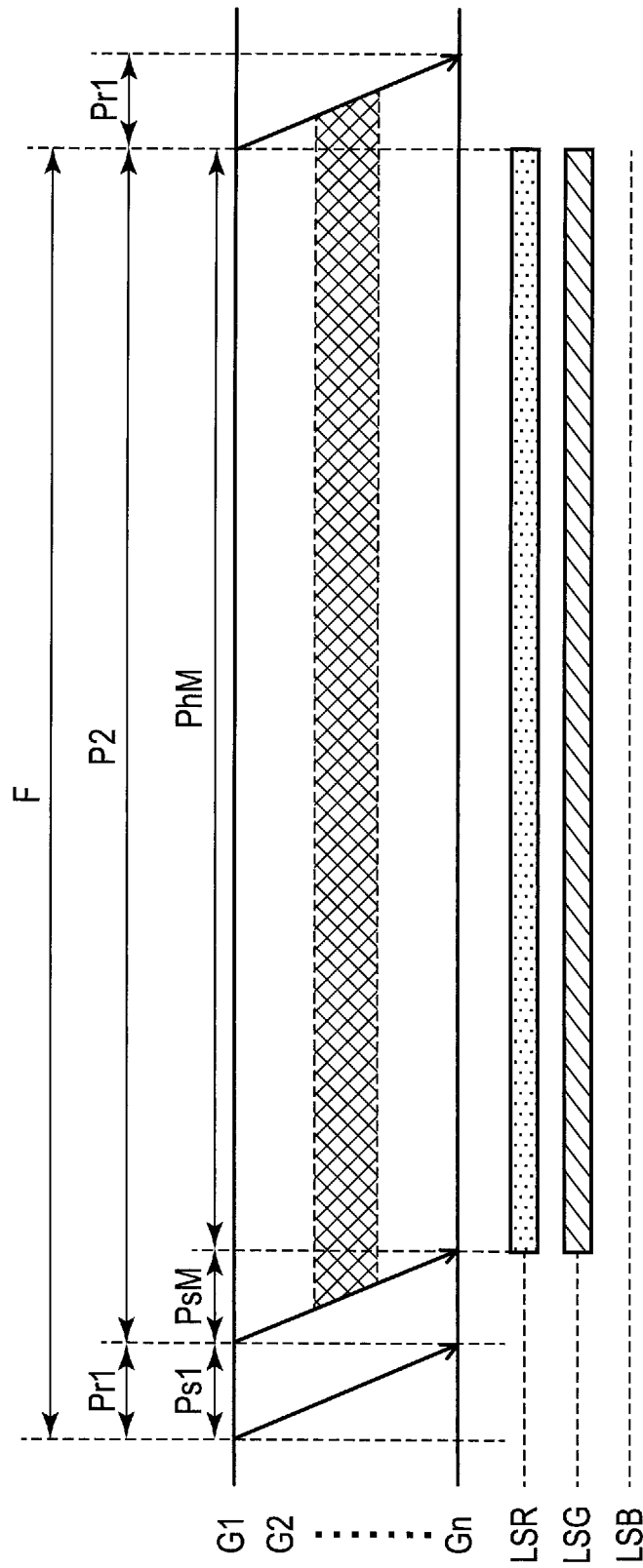
FIG. 22 is a timing chart showing an example of the display operation of the display device of modification example 2 of the first embodiment.

As shown in FIG. 22, FIG. 13 and FIG. 20, in this example, each frame period F includes the first reset period Pr1. This structure is common to the example shown in FIG. 22 and the example shown in FIG. 21. Each frame period F includes the second period P2 in place of the first sub-frame period PfR, the second sub-frame period PfG and the third sub-frame period PfB.

In the second period P2, the controller drives all the scanning lines G electrically connected to the pixels PX provided in the non-object areas NOA in addition to all the scanning lines G electrically connected to the pixels PX provided in the object area OA. The controller writes the second transparent voltage to the pixels PX provided in the non-object areas NOA and applies scattering voltage or the first transparent voltage to the pixels PX provided in the object area OA.

In the retention period PhM, light-emitting elements LS corresponding to the color of the image to be displayed light up. As shown in FIG. 22, the light-emitting elements LS may continue to light up until the scanning of the scanning lines G1 to Gn in the first reset period Pr1 of the next period F is completed. Alternatively, the light-emitting elements LS may continue to light up only during the retention period PhM. In the example of FIG. 22, the red light-emitting element LSR and the green light-emitting element LSG light up. In this way, yellow as a light source color is obtained by mixing red and green. A yellow image is displayed in the display area DA.

In a manner different from that of modification example 2, each frame period F may not include any reset period such as the first reset period Pr1. In this case, in each frame period, the second transparent voltage is applied to the pixels PX provided in the non-object areas NOA, and scattering voltage or the first transparent voltage is applied to the pixels PX provided in the object area OA.

Modification Example 3 of First Embodiment

Now, this specification explains modification example 3 of the first embodiment.

Figure 23:
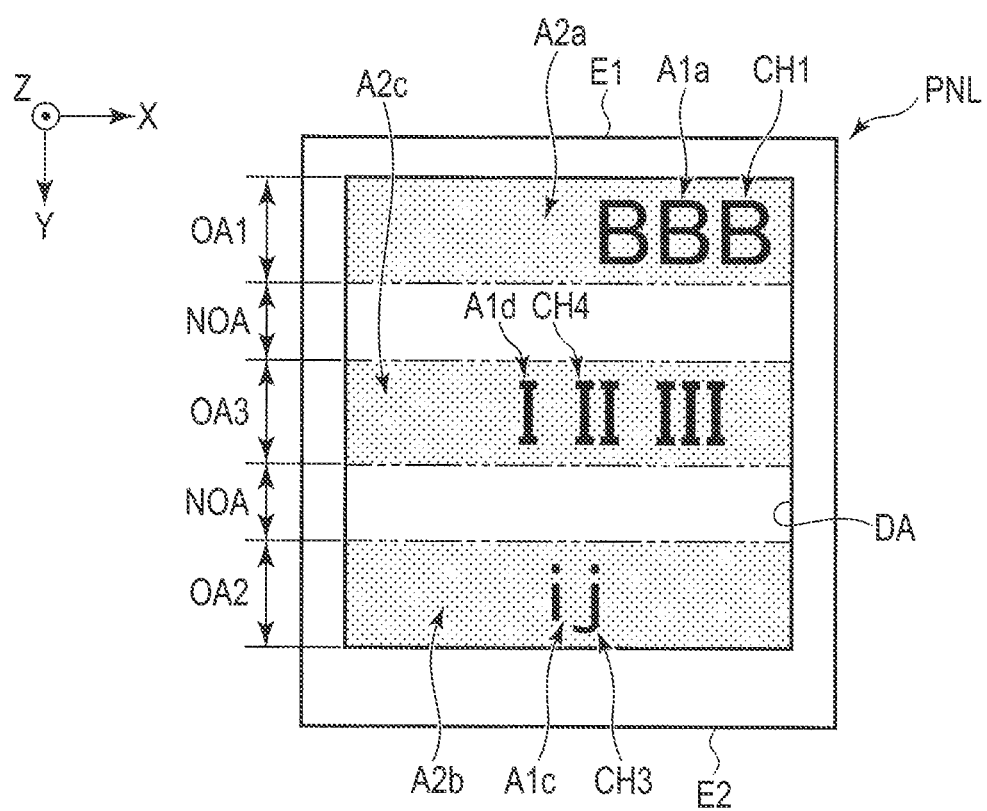
FIG. 23 shows a usage example of the display device of modification example 3 of the first embodiment, and is a plan view of the display panel showing a state in which characters are displayed in three object areas.

As shown in FIG. 23, the display area DA comprises the object area OA1 at the edge on the edge E1 side, the object area OA2 at the edge on the edge E2 side, an object area OA3 between the object area OA1 and the object area OA2, the non-object area NOA between the object area OA1 and the object area OA3, and the non-object area NOA between the object area OA2 and the object area OA3. The object area OA3 comprises a first area A1$d$ for displaying the characters CH4 of the character string "I II III", and a second area A2$c$ other than the first area A1$d$.

Different colors may be applied to respective groups of characters. In this example, the characters CH1 are red. The characters CH4 are green. The characters CH3 are blue.

Figure 24:
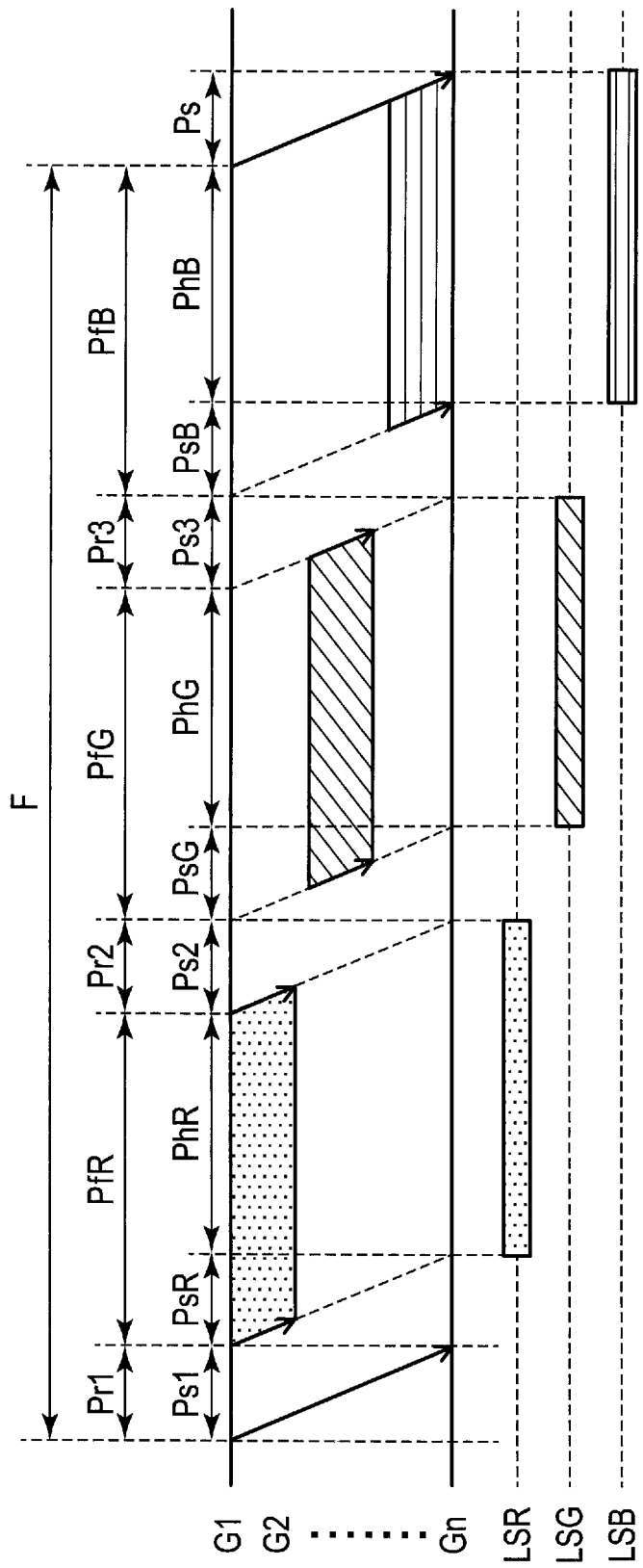
FIG. 24 is a timing chart showing an example of the display operation of the display device of modification example 3.

Now, this specification explains the display operation of each frame period for displaying the characters CH1, CH3 and CH4 as shown in FIG. 23, using the display operation of FIG. 24.

As shown in FIG. 24, FIG. 13 and FIG. 23, each frame period F includes the first reset period Pr1, the first sub-frame period PfR, the second reset period Pr2, the second sub-frame period PfG, the third reset period Pr3 and the third sub-frame period NB. In each reset period Pr, the controller applies the second transparent voltage to the first liquid crystal layer 30C, the second liquid crystal layer 30D and the third liquid crystal layer 30E. Thus, in the second reset period Pr2, scanning for writing the second transparent voltage to the object area OA1 scanned in the first sub-frame period PfR immediately before the second reset period Pr2 is performed, and thus, the display of the object area OA1 is reset. Similarly, in the third reset period Pr3, scanning for writing the second transparent voltage to the object area OA3 scanned in the second sub-frame period PfG immediately before the third reset period Pr3 is performed, and thus, the display of the object area OA3 is reset. In each scanning period Ps, the controller switches the light source unit LU to a turn-off state in which the liquid crystal layer 30 is not irradiated with light.

In the first sub-frame period PfR, the controller drives all the scanning lines G electrically connected to the pixels PX provided in the object area OA1, and does not drive the other scanning lines G. The pixels PX provided in the area other than the object area OA1 maintain the second transparent voltage written in the first reset period Pr1. Thus, transparency can be maintained in the area other than the object area OA1 even without driving the scanning lines G In the retention period PhR and a scanning period Ps2, the light-emitting element LSR emits red light. In this way, the red characters CH1 are displayed in the object area OA1.

In the second sub-frame period PfG, the controller drives all the scanning lines G electrically connected to the pixels PX provided in the object area OA3, and does not drive the other scanning lines G. In the retention period PhG and a scanning period Ps3, the light-emitting element LSG emits green light. In this way, the green characters CH4 are displayed in the object area OA3.

In the third sub-frame period NB, the controller drives all the scanning lines G electrically connected to the pixels PX provided in the object area OA2, and does not drive the other scanning lines G. In the retention period PhB and the scanning period Ps following the retention period PhB, the light-emitting element LSB emits blue light. In this way, the blue characters CH3 are displayed in the object area OA2.

In the example shown in FIG. 24, only pixels PX corresponding to the object area OA1 should be selectively driven in the first sub-frame period PfR. Only pixels PX corresponding to the object area OA3 should be selectively driven in the second sub-frame period PfG. Only pixels PX corresponding to the object area OA2 should be selectively driven in the third sub-frame period PfB. The scanning lines G provided in the area other than a corresponding object area OA may not be driven in each sub-frame period Pf. The signal lines S may not be driven in the entire period in any of the scanning periods Ps. Thus, the drive power of the display device DSP can be reduced.

Modification Example 4 of First Embodiment

Now, this specification explains modification example 4 of the first embodiment.

As shown in FIG. 25, different colors may be applied to respective groups of characters. In this example, yellow obtained by mixing red and green is applied to the characters CH1. Blue is applied to the characters CH3.

Now, this specification explains the display operation of each frame period for displaying the characters CH1 and CH3 as shown in FIG. 25, using the display operation of FIG. 26.

As shown in FIG. 26, FIG. 13 and FIG. 25, each frame period F includes the first sub-frame period PfR, the second sub-frame period PfG and the third sub-frame period NB. In each scanning period Ps, the controller switches the light source unit LU to a turn-off state in which the liquid crystal layer 30 is not irradiated with light.

In the first sub-frame period PfR, the controller drives all the scanning lines G electrically connected to the pixels PX provided in the area other than the object area OA1 as well as all the scanning lines G electrically connected to the pixels PX provided in the object area OA1. The controller writes the second transparent voltage to the pixels PX provided in the area other than the object area OA1, and applies scattering voltage or the first transparent voltage to the pixels PX provided in the object area OA1. For example, in the first sub-frame period PfR, 0 V of signal line voltage Vsig is applied to the pixels PX provided in the area other than the object area OA1 when common voltage Vcom is 0 V. In the first sub-frame period PfR, 16 V of signal line voltage Vsig is applied to the pixels PX provided in the area other than the object area OA1 when common voltage Vcom is 16 V. In the retention period PhR, the light-emitting element LSR emits red light. In this way, red can be applied to the characters CH1.

Similarly, the controller drives all the scanning lines G in the second sub-frame period PfG. The controller writes the second transparent voltage to the pixels PX provided in the area other than the object area OA1, and applies scattering voltage or the first transparent voltage to the pixels PX provided in the object area OA1. In the retention period PhG, the light-emitting element LSG emits green light. In this way, green can be applied to the characters CH1. In the above manner, yellow as a mixed color can be applied to the characters CH1 by the drive of the first sub-frame period PfR and the drive of the second sub-frame period PfG.

In the third sub-frame period PfB, the controller drives all the scanning lines G electrically connected to the pixels PX provided in the area other than the object area OA2 as well as all the scanning lines G electrically connected to the pixels PX provided in the object area OA2. The controller writes the second transparent voltage to the pixels PX provided in the area other than the object area OA2, and applies scattering voltage or the first transparent voltage to the pixels PX provided in the object area OA2. In the retention period PhB, the light-emitting element LSB emits blue light. In this way, blue can be applied to the characters CH3.

Second Embodiment

In a second embodiment, differences from the first embodiment are mainly explained. The explanation of the same structures as the first embodiment is omitted.

Figure 27:
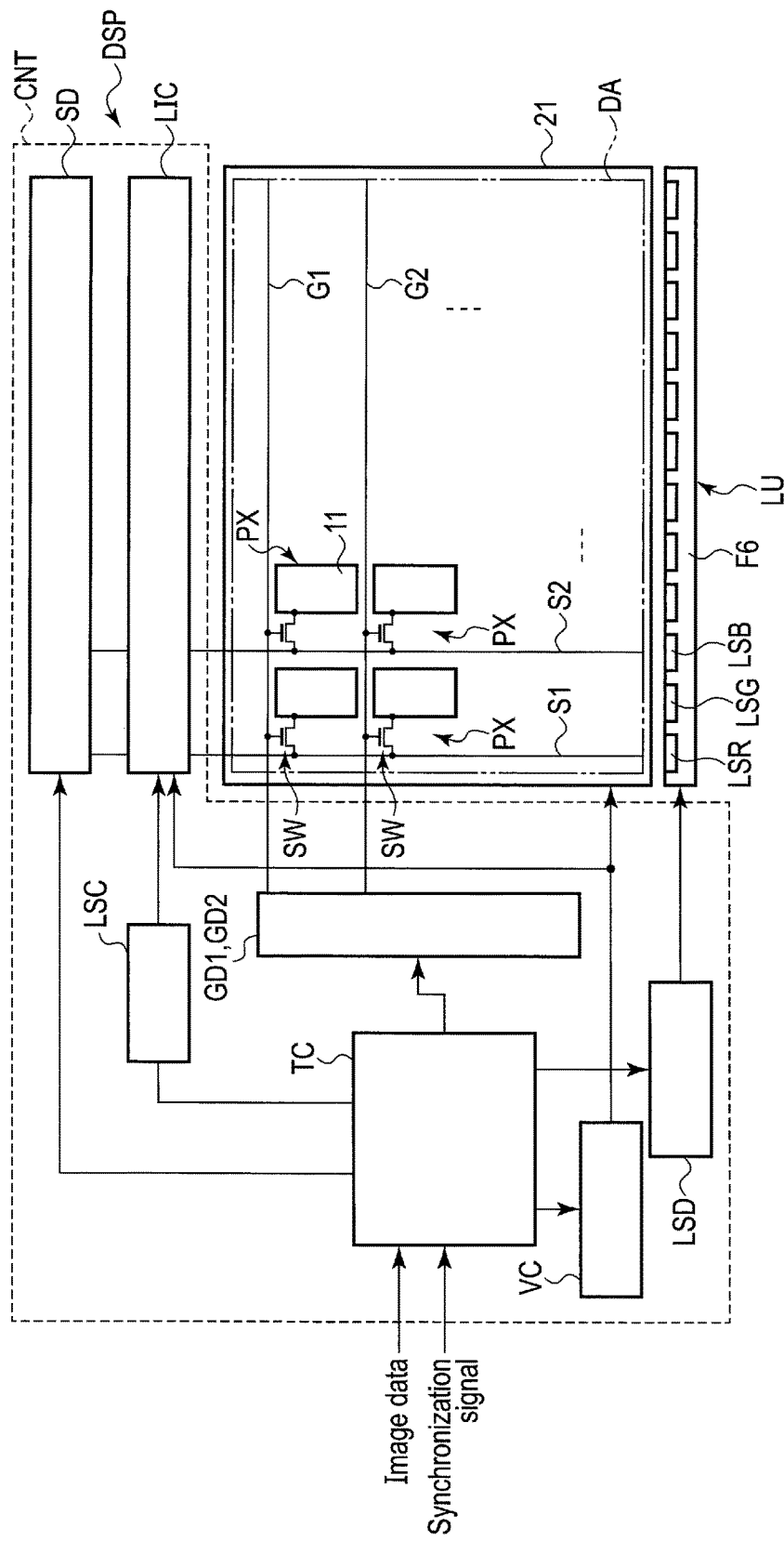
FIG. 27 shows the main structural components of a display device according to a second embodiment.

FIG. 27 shows the main structural components of a display device DSP according to the present embodiment.

As shown in FIG. 27, in the display device DSP, a controller CNT comprises a level conversion circuit (a level shift circuit) LSC and a Vcom lead-in circuit LIC. In this respect, the structure is different from that shown in FIG. 3.

The common voltage (Vcom) applied from a Vcom circuit VC is applied to a common electrode 21, and is also applied to the Vcom lead-in circuit LIC. The Vcom lead-in circuit LIC is interposed between a source driver SD and each signal line S. The Vcom lead-in circuit LIC supplies a video signal output from the source driver SD to each signal line S. The Vcom lead-in circuit LIC is also capable of applying the common voltage applied from the Vcom circuit VC to each signal line S.

FIG. 28 shows a structural example of the Vcom lead-in circuit LIC. The Vcom lead-in circuit LIC comprises switching elements SW1 to SWm. The switching elements SW1 to SWm are provided on, for example, a first substrate SUB1 provided in a display panel PNL. A line LN1 is connected to the input terminals (sources) of the switching elements SW1 to SWm. Signal lines S1 to Sm are connected to the output terminals (drains) of the switching elements SW1 to SWm. A line LN2 is connected to the control terminals (gates) of the switching elements SW1 to SWm. When the switching elements SW1 to SWm are turned on, the output of the source driver SD is high impedance.

The Vcom circuit VC shown in FIG. 27 applies common voltage Vcom to the line LN1. This operation may be applied to the drive when second transparent voltage is written to the pixels PX provided in a non-object area NOA, the drive in a reset period, or both the drive when the second transparent voltage is written to the pixels PX provided in the non-object area NOA and the drive in a reset period. A timing controller TC outputs a control signal to the level conversion circuit LSC when transparent scanning is performed. The level conversion circuit LSC converts the control signal into voltage at a predetermined level and supplies the control signal to the line LN2. When the control signal is supplied to the line LN2, the line LN1 is electrically continuous with the signal lines S1 to Sm. The common voltage Vcom of the line LN1 is applied to the signal lines S1 to Sm.

When a scanning signal is supplied to the scanning lines G1 to Gn in a state where common voltage Vcom is applied to the signal lines S1 to Sm, the common voltage Vcom of the signal lines S1 to Sm is applied to each pixel electrode 11. Thus, the potential difference between each pixel electrode 11 and the common electrode 21 is 0 V (the second transparent voltage).

Even in the structure of the present embodiment, transparent scanning similar to that of the first embodiment can be performed. Transparent scanning may be performed based on timing similar to that of the first embodiment. In the structure of the present embodiment, for example, there is no need to provide a circuit for applying voltage (for example, common voltage Vcom) for transparent scanning to the source driver SD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is possible to combine two or more of the embodiments and modification examples with each other if needed.

The sub-frame data stored in the line memories 52R, 52G and 52B is examples of first sub-frame data indicating an image in the first color, second sub-frame data indicating an image in the second color and third sub-frame data indicating an image in the third color.

The first, second and third colors are not limited to red, green and blue, respectively. The number of types of light-emitting elements LS provided in the light source unit LU may be less than or greater than three. The number of line memories, sub-frame data and sub-frame periods may be increased or decreased in accordance with the number of types (colors) of light-emitting elements LS.

A normal mode polymer dispersed liquid crystal may be used for the liquid crystal layer 30. The liquid crystal layer 30 maintains the parallelism of incident light when the applied voltage is high. The liquid crystal layer 30 scatters incident light when the applied voltage is low.

What is claimed is:

1. A display device comprising:
a display panel comprising:
a plurality of pixel electrodes located in a display area, and provided in each of a plurality of rows;
a common electrode located in the display area; and
a display function layer located in the display area;
a light source unit located a non-display area outside the display area, and emitting light in a color other than an achromatic color to the display function layer; and
a controller which controls a driving of the pixel electrodes, the common electrode and the light source unit, wherein
when a character is displayed in a first area of the display area, the controller applies a color other than the achromatic color to the first area, and makes a second area and a non-object area transparent,
the second area is an area other than the first area in an object area at least including an entire area of a row in which the first area is located,
the non-object area is an area other than the object area in the display area,
transparency of the non-object area is higher than transparency of the second area,
the object area has a rectangular area including continuous rows from a left end to a right end of the object area,
the non-object area has a rectangular area including other continuous rows from a left end to a right end of the non-object area, and adjoins the object area,
the display function layer is a liquid crystal layer using a polymer dispersed liquid crystal, and
the light source unit emits light from a side of the display panel into the display panel.

2. A display device comprising:
a display panel comprising:
a plurality of pixel electrodes located in a display area, and provided in a plurality of rows;
a common electrode located in the display area; and
a display function layer located in the display area;
a light source unit located a non-display area outside the display area, and emitting light in a color other than an achromatic color to the display function layer; and
a controller which controls a driving of the pixel electrodes, the common electrode and the light source unit, wherein
when a character is displayed in a first area of the display area, the controller applies a color other than the achromatic color to the first area, and makes a second area and a non-object area transparent,
the second area is an area other than the first area in an object area at least including an entire area of a row in which the first area is located,
the non-object area is an area other than the object area in the display area,
transparency of the non-object area is higher than transparency of the second area,
the pixel electrodes include a first pixel electrode located in the first area, a second pixel electrode located in the second area, and a third pixel electrode located in the non-object area,
the display function layer
includes a first display function layer to which voltage applied between the first pixel electrode and the common electrode is applied, a second display function layer to which voltage applied between the second pixel electrode and the common electrode is applied, and a third display function layer to which voltage applied between the third pixel electrode and the common electrode is applied, and
scatters incident light when scattering voltage is applied, maintains parallelism of incident light when first transparent voltage is applied, and maintains parallelism of incident light when second transparent voltage is applied,
parallelism of light passing through the display function layer when the second transparent voltage is applied is higher than parallelism of light passing through the display function layer when the first transparent voltage is applied,
a degree of scattering of light passing through the display function layer when the scattering voltage is applied is higher than a degree of scattering of light passing through the display function layer when the first transparent voltage is applied, and when the character is displayed in the first area, the controller applies the scattering voltage to the first display function layer, applies the first transparent voltage to the second display function layer, and applies the second transparent voltage to the third display function layer.

3. The display device of claim 2, wherein
in a frame period of a period for displaying the character in the first area, the controller drives the light source unit to irradiate the display function layer with light, and applies the scattering voltage to the first display function layer, applies the first transparent voltage to the second display function layer and applies the second transparent voltage to the third display function layer while the display function layer is irradiated with light.

4. The display device of claim 3, wherein
the light source unit comprises a first light-emitting element which emits light in a first color to the display function layer, a second light-emitting element which emits light in a second color to the display function layer, and a third light-emitting element which emits light in a third color to the display function layer, the frame period comprises a first sub-frame period in which the first light-emitting element emits light in the first color, a second sub-frame period in which the second light-emitting element emits light in the second color, and a third sub-frame period in which the third light-emitting element emits light in the third color, and the controller applies the first transparent voltage to the second display function layer and applies the second transparent voltage to the third display function layer in all of the first sub-frame period, the second sub-frame period and the third sub-frame period, and applies the scattering voltage to the first display function layer in at least one of the first sub-frame period, the second sub-frame period and the third sub-frame period.

5. The display device of claim 4, wherein
the frame period further comprises a first reset period which is a head period of the frame period, and in the first reset period, the controller applies the second transparent voltage to the first display function layer, the second display function layer and the third display function layer, and switches the light source unit to a turn-off state in which the display function layer is not irradiated with light.

6. The display device of claim 5, wherein
the first frame period further comprises a second reset period between the first sub-frame period and the second sub-frame period, and a third reset period between the second sub-frame period and the third sub-frame period, and in the second reset period and the third reset period, the controller applies the second transparent voltage to the first display function layer, the second display function layer and the third display function layer, and switches the light source unit to a turn-off state in which the display function layer is not irradiated with light.

7. The display device of claim 2, wherein
the display panel further comprises a plurality of scanning lines extending in a row direction, the first pixel electrode and the second pixel electrode are electrically connected to the same scanning line of the scanning lines, and the third pixel electrode is electrically connected to another scanning line of the scanning lines.

8. The display device of claim 2, wherein
the display function layer is a liquid crystal layer using a reverse mode polymer dispersed liquid crystal, the scattering voltage comprises positive scattering voltage and negative scattering voltage, and when the character is displayed in the first area, the controller alternately applies the positive scattering voltage and the negative scattering voltage to the first display function layer depending on each frame period.

9. The display device of claim 8, wherein
when the character is displayed in the first area, the controller alternately applies positive first transparent voltage and negative first transparent voltage to the second display function layer depending on each frame period, and when a highest degree of scattering of light entering the liquid crystal layer when each of the positive scattering voltage and the negative scattering voltage is applied to the liquid crystal layer is 100%, the positive first transparent voltage and the negative first transparent voltage are voltages in which the degree of scattering is less than or equal to 50%.

10. The display device of claim 8, wherein
the second transparent voltage is 0 V.

11. A display device comprising:
a display panel comprising:
a display area including a first area and a second area, the second area being an area other than the first area in an object area at least including an entire area of a row in which the first area is located;
a plurality of pixel electrodes including a first pixel electrode located in the first area and a second pixel electrode located in the second area, located in the display area, and provided in each of a plurality of rows;
a common electrode located in the display area; and
a liquid crystal layer including a first liquid crystal layer to which voltage applied between the first pixel electrode and the common electrode is applied and a second liquid crystal layer to which voltage applied between the second pixel electrode and the common electrode is applied, located in the display area, and using a reverse mode polymer dispersed liquid crystal;
a light source unit located a non-display area outside the display area, and emitting light to the liquid crystal layer; and
a controller which controls a driving of the pixel electrodes, the common electrode and the light source unit, wherein when a character is displayed in the first area of the display area, the controller applies scattering voltage to the first liquid crystal layer and scatters light entering the first liquid crystal layer, and applies first transparent voltage to the second liquid crystal layer, maintains parallelism of light entering the second liquid crystal layer, and makes the second area transparent, when a highest degree of scattering of light entering the liquid crystal layer when the scattering voltage is applied to the liquid crystal layer is 100%, the first transparent voltage is voltage in which the degree of scattering is less than or equal to 50%, the object area has a rectangular area including continuous rows from a left end to a right end of the object area, the non-object area has a rectangular area including other continuous rows from a left end to a right end of the non-object area, and adjoins the object area, transparency of the non-object area is higher than transparency of the second area, and the light source unit emits light from a side of the display panel into the display panel.

12. The display device of claim 11, wherein in a frame period of a period for displaying the character in the first area, the controller drives the light source unit to irradiate the liquid crystal layer with light, and applies the scattering voltage to the first liquid crystal layer, applies the first transparent voltage to the second liquid crystal layer and applies the second transparent voltage to the third liquid crystal layer while the liquid crystal layer is irradiated with light.

13. The display device of claim 12, wherein the light source unit comprises a first light-emitting element which emits light in a first color to the liquid crystal layer, a second light-emitting element which emits light in a second color to the liquid crystal layer, and a third light-emitting element which emits light in a third color to the liquid crystal layer, the frame period comprises a first sub-frame period in which the first light-emitting element emits light in the first color, a second sub-frame period in which the second light-emitting element emits light in the second color, and a third sub-frame period in which the third light-emitting element emits light in the third color, and the controller applies the first transparent voltage to the second liquid crystal layer and applies the second transparent voltage to the third liquid crystal layer in all of the first sub-frame period, the second sub-frame period and the third sub-frame period, and applies the scattering voltage to the first liquid crystal layer in at least one of the first sub-frame period, the second sub-frame period and the third sub-frame period.

14. The display device of claim 13, wherein the frame period further comprises a first reset period which is a head period of the frame period, and in the first reset period, the controller applies the second transparent voltage to the first liquid crystal layer, the second liquid crystal layer and the third liquid crystal layer, and switches the light source unit to a turn-off state in which the liquid crystal layer is not irradiated with light.

15. The display device of claim 14, wherein the frame period further comprises a second reset period between the first sub-frame period and the second sub-frame period, and a third reset period between the second sub-frame period and the third sub-frame period, and in the second reset period and the third reset period, the controller applies the second transparent voltage to the first liquid crystal layer, the second liquid crystal layer and the third liquid crystal layer, and switches the light source unit to a turn-off state in which the liquid crystal layer is not irradiated with light.

16. The display device of claim 11, wherein the display panel further comprises a plurality of scanning lines extending in a row direction, the first pixel electrode and the second pixel electrode are electrically connected to the same scanning line of the scanning lines, and the third pixel electrode is electrically connected to another scanning line of the scanning lines.

17. The display device of claim 12, wherein the scattering voltage comprises positive scattering voltage and negative scattering voltage, and when the character is displayed in the first area, the controller alternately applies the positive scattering voltage and the negative scattering voltage to the first liquid crystal layer depending on each frame period.

18. The display device of claim 17, wherein when the character is displayed in the first area, the controller alternately applies positive first transparent voltage and negative first transparent voltage to the second liquid crystal layer depending on each frame period, and when a highest degree of scattering of light entering the liquid crystal layer when each of the positive scattering voltage and the negative scattering voltage is applied to the liquid crystal layer is 100%, the positive first transparent voltage and the negative first transparent voltage are voltages in which the degree of scattering is less than or equal to 50%.

19. The display device of claim 17, wherein
the second transparent voltage is 0 V.

* * * * *